US010833861B2

(12) United States Patent
Chari et al.

(10) Patent No.: US 10,833,861 B2
(45) Date of Patent: Nov. 10, 2020

(54) PROTECTION OF CONFIDENTIALITY, PRIVACY AND OWNERSHIP ASSURANCE IN A BLOCKCHAIN BASED DECENTRALIZED IDENTITY MANAGEMENT SYSTEM

(71) Applicant: International Business Machines Corporation, Armonk, NY (US)

(72) Inventors: Suresh Chari, Scarsdale, NY (US); Hasini Gunasinghe, West Lafayette, IN (US); Hugo M. Krawczyk, Tarrytown, NY (US); Ashish Kundu, Elmsford, NY (US); Kapil Kumar Singh, Cary, NC (US); Dong Su, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 15/824,405

(22) Filed: Nov. 28, 2017

(65) Prior Publication Data
US 2019/0165943 A1    May 30, 2019

(51) Int. Cl.
H04L 9/32       (2006.01)
H04L 9/30       (2006.01)

(52) U.S. Cl.
CPC .............. H04L 9/3221 (2013.01); H04L 9/30 (2013.01); H04L 9/3218 (2013.01); H04L 9/3236 (2013.01); H04L 9/3239 (2013.01); H04L 9/3247 (2013.01); H04L 2209/38 (2013.01); H04L 2209/56 (2013.01)

(58) Field of Classification Search
CPC . H04L 9/32; H04L 9/08; H04L 9/3221; H04L 9/30; H04L 9/3218; H04L 9/3236; H04L 9/3239; H04L 9/3247
See application file for complete search history.

(56) References Cited

U.S. PATENT DOCUMENTS

| 2013/0282580 | A1  | 10/2013 | O'Brien et al. |
| 2017/0149819 | A1  | 5/2017  | Androulaki et al. |
| 2017/0222814 | A1  | 8/2017  | Oberhauser et al. |
| 2017/0346833 | A1* | 11/2017 | Zhang ................... H04L 63/123 |
| 2018/0041338 | A1* | 2/2018  | Nighswander ...... G06F 21/6209 |
| 2018/0167394 | A1* | 6/2018  | High ..................... H04L 63/123 |

(Continued)

OTHER PUBLICATIONS

NPL Search (Google Scholar) (Year: 2020).*
P. Mell et al., "The Nist Definition of Cloud Computing", National Institute of Standards and Technology, Information Technology Laboratory, Sep. 2011, pp. 1-7.

(Continued)

*Primary Examiner* — Mahfuzur Rahman
*Assistant Examiner* — Richard W Cruz-Franqui
(74) *Attorney, Agent, or Firm* — Law Office of Jim Boice

(57) ABSTRACT

A processor-implemented method improves security in a blockchain network of devices by protecting security, privacy and ownership assurance of identity assets, where the blockchain network of devices supports a blockchain. An identity asset provider device establishes co-ownership of an identity asset for an identity asset provider and an entity. The identity asset provider device directs a first member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices.

16 Claims, 22 Drawing Sheets

(56) References Cited

U.S. PATENT DOCUMENTS

| | | | |
|---|---|---|---|
| 2018/0181953 A1* | 6/2018 | Lacoss-Arnold | G06Q 20/027 |
| 2019/0165943 A1* | 5/2019 | Chari | H04L 9/3218 |
| 2019/0182035 A1* | 6/2019 | Chari | H04L 9/0861 |
| 2019/0295162 A1* | 9/2019 | Wang | H04L 9/0866 |
| 2020/0036515 A1* | 1/2020 | Chari | G06F 21/602 |
| 2020/0044848 A1* | 2/2020 | Chari | H04L 9/3239 |
| 2020/0184470 A1* | 6/2020 | Singh | G06Q 20/389 |
| 2020/0204557 A1* | 6/2020 | Singh | G06F 16/337 |

OTHER PUBLICATIONS

Ben-Sasson et al., "Zerocash: Decentralized Anonymous Payments From Bitcoin." 2014 IEEE Symposium on Security and Privacy: 459-474.

Adelsbach et al., "Proving Owndership of Digital Content." IH '99 Proceedings of the Third International Workshop on Information Hiding, ACM, 117-133.

Adelsbach et al., "Zero-Knowledge Watermark Detection and Proof of Ownership." IH '01 International Workshop on Information Hiding, 273-288.

Marcin Andrychowicz et al.. 2014. Secure Multiparty Computations on Bitcoin. In Proceedings of the 2014 IEEE Symposium on Security and Privacy (SP '14). IEEE Computer Society, Washington, DC, USA, 443-458. DOI: http://dx.doi.org/10.1109/SP.2014.35.

Ahmed Kosba et al. 2016. Hawk: The Blockchain Model of Cryptography and Privacy-Preserving Smart Contracts. Security and Privacy (SP), 2016 IEEE Symposium on. IEEE Computer Society, Washington, DC, USA, 839-858. 10.1109/SP.2016.55.

\* cited by examiner

| USE CASE | SAMPLE IDENTITY VERIFICATION/DUE DILIGENCE CHECKLIST |
|---|---|
| 1. CONSUMING FINANCIAL SERVICES OFFERED BY A BANK | - IDENTITY (E.G. PASSPORT)<br>- FINANCIAL ELIGIBILITY<br>- PROOF OF ADDRESS<br>- STATUS OF ANTI-MONEY LAUNDERING (AML) COUNTER-TERRORIST FINANCING (CTF) AND NON-POLITICALLY EXPOSED PERSON (PEP) (1) |
| 2. JOINING A NEW EMPLOYMENT | - IDENTITY (E.G. PASSPORT)<br>- VISA STATUS (I-20, I-94)<br>- EMPLOYMENT ELIGIBILITY (SSN)<br>- EMPLOYMENT HISTORY FOR 5 YEARS, EDUCATION HISTORY<br>- BACKGROUND CHECK ON CHARACTER/REPUTATION/PROFESSIONAL EXPERIENCE |
| 3. APPLYING FOR TEMPORARY VISA IN A FOREIGN COUNTRY | - PROOF OF CITIZENSHIP<br>- PROOF OF RETURNING TO THE HOME COUNTRY SUCH AS USER'S ASSETS AND BONDS<br>- CRIMINAL HISTORY |

FIG. 2

VERIFICATION OF KYC COMPLIANCE FOR BOB

| ATTRIBUTE NAME | VALUE | DATE VERIFIED/ EXPIRY DATE | SOURCE(S) OF INFORMATION AND LOA | IN PERSON/ REMOTE |
|---|---|---|---|---|
| PRIMARY IDENTITIES | COPIES | 03/17 \| 06/22 | N/A | IN PERSON |
| PEP STATUS | DETAILS | 03/17 \| 03/25 | XYZ | REMOTE |
| AML STATUS | DETAILS | 03/17 \| 03/22 | ABC | REMOTE |
| CTF STATUS | - - - | - - - | - - - | - - - |

RELATIONSHIP ATTRIBUTES

DATE OF ORIGIN: xx-xx-xxxx
VALIDITY PERIOD: xx YEARS
VALUE: PLATINUM/GOLD/SILVER ETC.

Protocol 1 Ownership declaration

Inputs: $IAP_{pk}, U_{pk}, IAP'_{sk}, U'_{sk}, h$.

Output: The composite commitment, representing the ownership declaration, is added to the merkle hash tree of the commitments.

Protocol execution:
1. User:
   i. Chooses random $r_U$ and creates commitment on $U_{pk}$: $C_U = \text{commit}(U_{pk}, r_U)$.
   ii. User sends $C_U$ to IAP and proves in zero knowledge, well-formedness of $C_U$.
2. IAP:
   i. Verifies well-formedness of $C_U$.
   ii. Chooses random $r_p$ and creates commitment on $IAP_{pk}$: $C_p = \text{commit}(IAP_{pk}, r_p)$.
   iii. Chooses random $r_h$ and creates commitment on $h$: $C_h = \text{commit}(h, r_h)$.
   iv. Chooses random $r_c$ and creates the composite commitment: $C_c = \text{commit }(\text{date } ||C_u||C_p||C_h||r_c)$.
   v. Signs the composite commitment and prepares the message to be sent to the user:
   $T_{dec1} = [C_c, sign_{IAP'sk}(C_c), IAP'_{pk}]$.
   vi. Sends $T_{dec1}$ to the user and proves in zero-knowledge, well-formedness of $C_c$.
3. User:
   i. Verifies well-formedness of $C_c$ and the signature on $T_{dec1}$.
   ii. Signs $T_{dec1}$ and posts $T_{dec2} = [T_{dec1}, sign_{U'sk}(T_{dec1}), U'_{pk}]$ to the blockchain as the ownership declaration transaction.
4. Blockchain Peers:
   i. Verifies the signatures on $T_{dec2}$ and append it to the ledger and add it to the merkle hash tree maintained in the ledger.

FIG. 14

PROTOCOL 2 VERIFYING NON-DUPLICATION

INPUT FROM IAP: COMMITMENT ON THE HASH OF THE IDENTITY ASSET.

OUTPUT: DECISION BY THE BLOCKCHAIN PEERS ON WHETHER THE OWNERSHIP DECLARATION IS DUPLICATED OR NOT.

IF NOT DUPLICATED, POLYNOMIAL OF THE ENCRYPTED HASH VALUES OF THE IDENTITY ASSET IS UPDATED WITH THE ENCRYPTED HASH VALUE OF THE NEW IDENTITY ASSET. THE COMPOSIT COMMITMENT IS ADDED TO THE MERKLE HASH TREE OF THE COMMITMENTS.

PROTOCOL EXECUTION:
1. IAP:
   i. CHOOSES RANDOM d AND CREATED COMMITMENT ON h : C=commit(h,d).
   ii. CHOOSE RANDOM r AND COMPUTE e=E(r*P(h)), I.E. AN ENCRYPTION OF THE RESULT OF EVALUATING P(h) TIMES THE RANDOM VALUE r. e IS COMPUTED AS THE HOMOMORPHIC ENCRYPTION OF: $r * \sum_{i=0}^{n} (E(P_i) * h^i)$. (i.e. $(\prod_{i=0}^{n}(E(P_i))^{h^i})^r)$.
   iii. PROVE IN ZK THAT THE VALUE e WAS COMPUTED CORRECTLY, NAMELY, IAP KNOWS r AND h FOR WHICH e=E(r*P(h)) AND h IS THE ONE COMMITTED IN THE VALUE C.

2. BLOCKCHAIN PEERS:
   i. IF IAP'S PROOF SUCCEEDS, THE PEERS DECRYPT e. IF THE RESULT IS 0 THEY REJECT h AS ALREADY PRESENT IN H, OTHERWISE THEY ACCEPT IT.

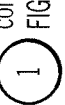
continued to FIG. 16B

FIG. 16A

3. IAP:

i. IF h IS ACCEPTED, IAP COMPUTES THE ENCRYPTED COEFFICIENTS OF THE n+1-DEGREE POLYNOMIAL (I.E.: $P(x)*(x-h)$).

IAP COMPUTES THE ENCRYPTED COEFFICIENTS OF THE POLYNOMIAL $P'(x)=P(x)*(x-h)$ ON THE BASIS OF ITS OWN VALUE h AND THE ENCRYPTED COEFFICIENTS $E(P_i)$ of $P(x)$ (WHICH ARE STORED AT BC). THE COMPUTATION IS:

FOR i=1,...,n+1, $E(P'_i) = E(P_{i-1}) + (-h)*E(P_i) + E(0)$. THE TERM $E(0)$ IS FOR RANDOMIZING THE CIPHERTEXT (WITHOUT IT ONE COULD REVEAL h)

ii. IAP PROVES IN ZK THAT ITS COMPUTATION IS CORRECT WITH RESPECT TO THE ALREADY EXISTED ENCRYPTED COEFFICIENTS OF P(x) IN BC AND THE COMMITTED VALUE h.

4. BLOCKCHAIN PEERS:

i. IF IAP'S PROOF SUCCEEDS, THE PEERS SUBMIT THE OWNERSHIP DECLARATION TRANSACTION TO BE ADDED TO THE LEDGER AND TO THE MERKLE HASH TREE OF COMMITMENTS.

FIG. 16B

Protocol 3 Proof of ownership

Inputs: $IAP_{sk}$, $U_{sk}$, identity asset: $A$, key for encrypting the identity asset: $K$, hash of $A$ $(=h')$, private keys of the anonymous identities used by the IAP and the user, during the transfer phase, namely: $IAP''_{sk}$, and $U''_{sk}$, respectively.

Output: Verification of the proof, identity asset transferred to the identity consumer.

Protocol execution:
1. IAP:
   i. Encrypts the identity asset to be transferred: $T_A = E_K(date\|A\|h')$.
   ii. Sends $T_A$ to user.

2. User:
   i. Creates proof: $II_{proofU}$ with the clauses: a, c, e (see $II_{proof}$ below).
   ii. Signs $II_{proofU}$ anonymously and sends $T_{proofU} = [II_{proofU}, signU''_{sk}(II_{proofU})]$ 3. IAP:
   i. Creates proof: $II_{proofP}$ with the clauses: a, b, c, d.
   ii. Creates the transfer transaction: $T_{transf} = [T_A, T_{proofU}, II_{proofP}, signIAP''_{sk}(T_A, T_{proofU}, II_{proofP})]$ and posts it to the blockchain.

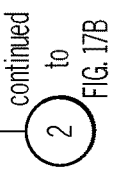

FIG. 17A

continued from FIG. 17A $\Pi_{proof}$: - zk-SNARK proof created by IAP and U for the following statements:
Given $rt$, I know $C_c$ s.t:
(a). $C_c$ is a leaf of the merkle hash tree with the root: $rt$.
(b). $C_c$ is well formed.
(c). $h'$ in $T_A$ of $T_{transf}$ and $h$ in $C_h$ of $C_c$ are equal.
(d). IAP owns the secret key $IAP_{sk}$ corresponding to the public key : $IAP_{pk}$ committed in $C_c$.
(e). User owns the secret key $U_{sk}$ corresponding to the public key : $U_{pk}$ committed in $C_c$.

4. Blockchain Peers:
i. Verifies the proof: $\Pi_{proof}$ and if the verification is successful, append $T_{transf}$ to the blockchain.

5. IAC:
i. Decrypts A from $T_A$ and checks the validity of A and if valid, posts a confirmation message to blockchain indicating the successful receipt of A.

FIG. 17B

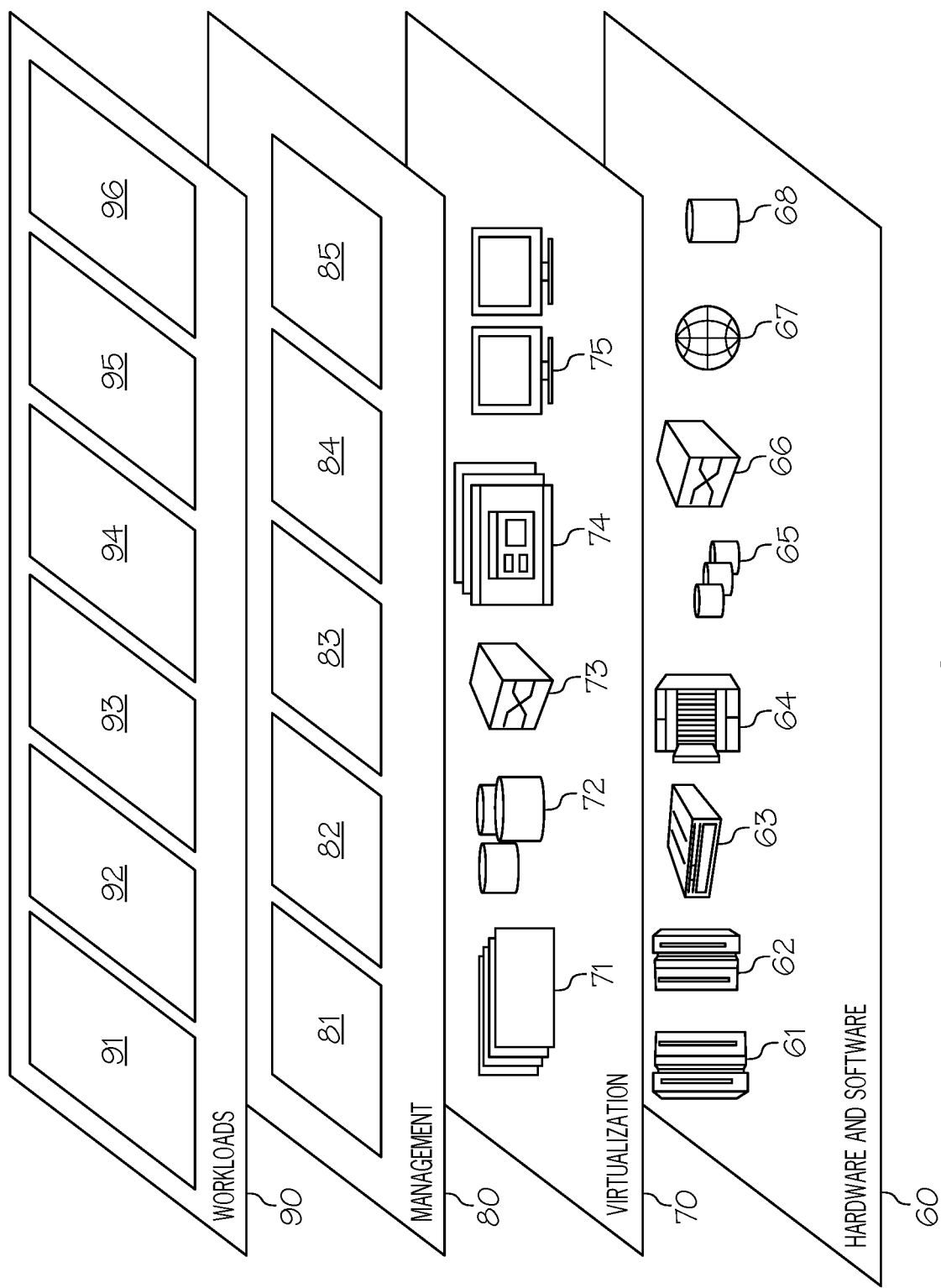

_US 10,833,861 B2_

PROTECTION OF CONFIDENTIALITY, PRIVACY AND OWNERSHIP ASSURANCE IN A BLOCKCHAIN BASED DECENTRALIZED IDENTITY MANAGEMENT SYSTEM

BACKGROUND

The present invention relates to the field of blockchains, and particularly to blockchains that support the exchange of identity assets. Still more particularly, the present invention relates to improving blockchains' confidentiality during the exchange of identity assets.

SUMMARY

In one or more embodiments of the present invention, a processor-implemented method improves security in a blockchain network of devices by protecting security, privacy and ownership assurance of identity assets, where the blockchain network of devices supports a blockchain. An identity asset provider device establishes co-ownership of an identity asset for an identity asset provider and an entity. The identity asset provider device directs a first member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices.

The described inventions may also be implemented in a computer system and/or as a computer program product.

BRIEF DESCRIPTION OF THE DRAWINGS

FIG. 2 illustrates exemplary use cases for the present invention;

FIG. 3 depicts an exemplary identity asset in accordance with one or more embodiments of the present invention;

FIG. 14 depicts Protocol 1, which is used in identity asset ownership declaration in a blockchain in accordance with one or more embodiments of the present invention;

FIGS. 16A-16B depict Protocol 2, which is used for verifying non-duplication of identity assets in a blockchain in accordance with one or more embodiments of the present invention;

FIGS. 17A-17B depict Protocol 3, which is used for proving ownership of an identity asset in accordance with one or more embodiments of the present invention;

FIG. 20 depicts abstraction model layers of a cloud computer environment according to an embodiment of the present invention.

DETAILED DESCRIPTION

Figure 1:
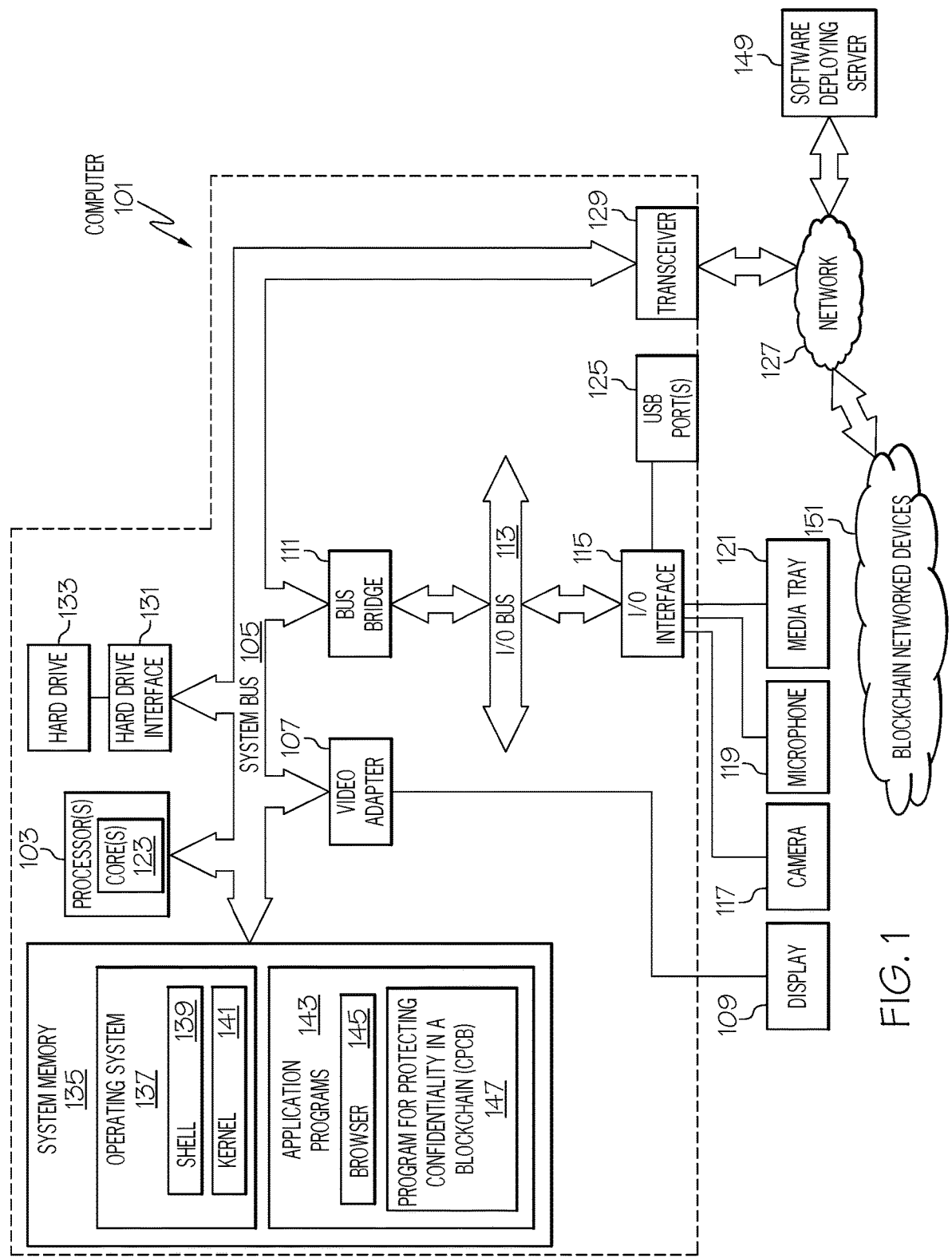
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or blockchain networked devices 151.

Exemplary computer 101 includes one or more processor(s) 103 that are coupled to a system bus 105. Processor(s) 103 may each utilize one or more core(s) 123, which contain execution units and other hardware beyond that found in the rest of the processor(s) 103 (e.g., on-board random access memory, etc.). A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117, a microphone 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as blockchain networked devices 151, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Protecting Confidentiality in a Blockchain (PPCB) 147. PPCB 147 includes code for implementing the processes described below, including those described in FIGS. 2-18. In one embodiment, computer 101 is able to download PPCB 147 from software deploying server 149, including in an on-demand basis, wherein the code in PPCB 147 is not downloaded until needed for execution. In one embodiment of the present invention, software deploying server 149 performs all of the functions associated with the present invention (including execution of PPCB), thus freeing computer 101 from having to use its own internal computing resources to execute PPCB 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

A digital asset (also referred to herein as an identity asset and a digital identity asset) is defined as digital information about a user and that identifies the user. Examples of a digital identity asset include, but are not limited to, financial information about the user, personal information about the user, consumer information about the user, etc. Digital identity assets describing users can be shared between parties in a digital identity ecosystem (e.g., identity providers and identity consumers), but only after the users (including the entity that is described by the digital identity asset) expressly provide their permission to do so.

As described herein, an identity provider and the identity consumer may exchange digital identity assets of a user that approves of the exchange. As part of digital identity management, the exchange preferably is anonymous. That is, the identity provider and identity consumer preferably stay anonymous to each other as well as to any party observing the transaction, except the user whose identity being exchanged. These anonymous identity exchange transactions also preferably are unlinkable. That is, multiple transactions exchanging the same identity asset of a given user should not be able to be linked. In this context, there are certain threats to the ownership of the identity asset due to possible collusion between two malicious parties against a genuine party/parties.

The present invention presents one or more solutions to these problems, which in one or more embodiments involves an anonymous ownership declaration followed by a verification of duplicated ownership declaration during identity asset creation and anonymous proof of ownership and verification during identity asset exchange, without affecting the anonymity and unlinkability properties of the identity exchange transactions.

In one or more embodiments, the present invention is utilized in an identity ecosystem that is operated on a trusted and decentralized identity platform backed by blockchain technology.

Users consume services from different service providers on a day-to-day basis, and access to such services are controlled by various identity verification processes. Some of these identity verification processes not only ask for individual pieces of identity information of a user such as email address, Social Security Number, passport number etc., but also require the user to go through certain due diligence processes in order to fulfill certain compliance requirements, such as Know Your Customer (KYC) compliance in the banking/financial sector, as well as to get to know the customer better.

Example scenarios and a sample identity verification and due diligence checklist associated with them are shown in Table 202 in FIG. 2, which shows example scenarios and associated sample identity verifications and due diligence checklists.

In the scenarios shown in Table 202, users must produce the required proofs of documents, fill out lengthy forms, visit the verifier in-person and wait for a considerable amount of time for the verification to go through. On the other hand, service providers also spend time and resources in performing these identity verification and due diligence steps. Once these identity verification/due diligence steps are performed with regard to a particular individual, the packages of information that result from such processes become the service providers' assets, which are referred to herein as identity assets. Examples of such identity assets are shown in FIG. 3 as exemplary identity asset 301, which is part of a KYC verification for a user named "Bob", as required in Use Case 1 in Table 202 from FIG. 2. Note that the entity (e.g., a bank) has invested a significant amount of resources (computer time, computer resources, electricity, personnel time, etc.) to create the identity asset 301. Nonetheless, since the identity asset 301 contains information about the user (Bob), the user has the right to request control over such an identity asset being held at different organizations/enterprises.

Previously, when the same individual(s) need to consume a similar service from another service provider, (e.g., consuming financial services in a different bank, joining another employer, applying for a visa in a different country, etc.), he/she is treated as a completely unrecognized person to the other service provider (i.e., he/she is a complete "stranger" to the other service provider), and is required to go through a similar verification/due diligence process again from the beginning with the second service provider. These repeated processes are expensive in terms of money, time, resources, etc. Since these lengthy processes are error-prone as well as time consuming, they also lead to frustrations and unsatisfactory user experiences.

Thus, one or more embodiments of the present invention present a process through which different service providers exchange aforementioned identity assets (the outcome of specialized identity verification and due diligence processes), in a decentralized manner (i.e., without involving a trusted central party), thus saving time and money, while also avoiding errors and frustrations. Specifically, one or more embodiments of the present invention optimize security and privacy provided by a blockchain environment when exchanging/sharing identity assets. In one or more embodiments, the initial service provider who actually performed the identity verification/due diligence process for the user (in order to create the identity asset), is motivated to share the identity asset (with the user's express permission) by being paid compensation from the enterprise/entity that is requesting the identity asset. It is to be understood that privacy of the user (i.e., protecting confidential information of the user, such as sensitive information about the user's identity and the transactions that the user performs) is to be protected whenever such an identity asset is exchanged. The present invention provides such an assurance through the novel use of a blockchain, which is described in detail below.

For explanatory purposes, Use Case 1 from table 202 is FIG. 2 will be used to describe the present invention. It is understood that other scenarios may also use the present invention.

Use Case 1: Bob first consumes financial services from bank A, where he performs identity verification and due diligence steps for KYC compliance. Later Bob needs to consume financial services from bank B as well. At this point, both Bob and bank B wants to know if Bob has already gone through such a process and if so, they would like to re-use the identity assets created during the initial process.

In this Use Case 1, although Bob would like to re-use the identity asset created at bank A when interacting with bank B, Bob would not like to reveal to bank B which bank(s) Bob has interacted with before. In the same way, Bob would not like to reveal to bank A, which bank(s) Bob is planning to be a customer of. Bank A and bank B themselves would also not like to reveal their identities to each other during the identity asset exchange, due to business competition. Therefore, the anonymity of the parties who exchange the identity asset is a key privacy requirement. On the other hand, Bob would not like the transactions he carries out (with different banks based on the same identity asset) to be linkable by anyone except bank A, who is providing the identity asset. Therefore, unlinkability of the transaction is another key privacy requirement that the improvements to the blockchain described herein achieve.

As just stated, a preferred embodiment of the present invention utilizes a blockchain. Exemplary blockchains are described now in FIGS. 4-8.

Figure 4:
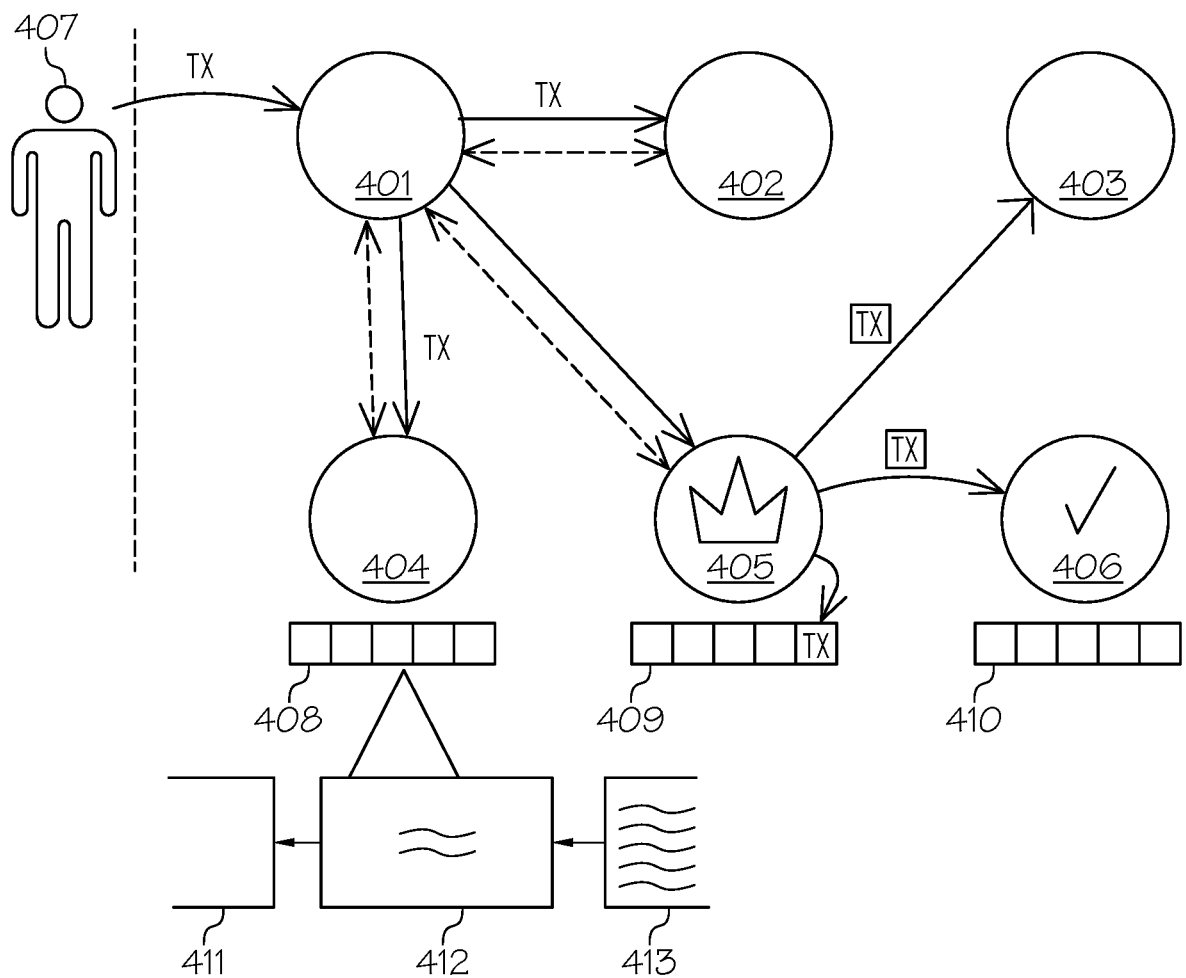
FIG. 4 depicts an exemplary blockchain architecture as used in one or more embodiments of the present invention.

With reference now to FIG. 4, an illustration of exemplary blockchains as used in one or more embodiments of the present invention is presented. As shown in FIG. 4, computers 401, 402, 403, 404, 405, and 406 represent an exemplary peer-to-peer network of devices used to support a peer blockchain (in which more or fewer computers/machines may form the peer-to-peer network of devices). Each of the computers 401, 402, 403, 404, 405 and 406 (which may be telecommunication devices, portable computers, servers, etc.) in the peer-to-peer network has a same copy of data (e.g., data that represents transaction events), as held in ledgers stored within the depicted blockchains 408, 409, 410 that are associated with respective computers 404, 405, 406.

As shown in FIG. 4, a client 407 (e.g., a computer) sends a transaction Tx (e.g., an event that occurred with the client 407) to the client's peer (depicted as computer 401). Computer 401 then sends the transaction Tx to ledgers known as the depicted blockchains 408, 409, 410 that are associated with other peers, including the depicted computers 402, 404, 405.

Blocks within exemplary blockchain 408 are depicted as block 411, block 412, and block 413. Block 413 is depicted as a newest entry into a ledger held in blockchain 408, and includes not only the newest transactions but also a hash of the data from the older block 412, which includes a hash of the even older block 411. Thus, older blocks are made even more secure each time a new block is created, due to the hashing operations.

As shown in FIG. 4, computer 405 has been designated as a leader peer according to a consensus model of the peer-to-peer network. In order to be designated as the leader peer, computer 405 has to be the first to "guess" what the data in Tx is. That is, computer 401 encrypted Tx with a known one-way encryption algorithm (e.g., Secure Hash Algorithm 2—"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 405 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 405 is working on this problem (of guessing what the input data to the SHA-2 algorithm by computer 401 is), other computers such as computers 401-404 and 406 are also working on the problem.

Assume now that computer 405 won the "race" to decrypt Tx before computers 401-404 and 406. Thus, computer 405 will send the data ("00000000xxxxxxxxxxxx") in a newly-encrypted form (using a key provided by computer 401) to one or more of computers 401-404 and 406. One or more of computers 401-404 and 406 will then check computer 405's work. For example, assume that Tx described client 407 spending $100.00. If the blockchain ledger shows that client 407 only has $80.00, then one or more of the computers 401-404 and 406 will assume that computer 405 did not accurately decrypt Tx. However, if the blockchain ledger shows that client 407 has $200.00, then one or more of the computers 401-404 and 406 will assume that computer 405 accurately decrypted Tx as being $100.00. Once a predefined quantity of peer computers from computers 401-404 and 406 agree that the decrypted value of Tx is correct, then computer 405 will be designated as the leader peer for Tx, and will be compensated (e.g., in money) for its use of computing resources. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 401-406 and is added to the blockchains (including the depicted blockchains 408, 409, 410) associated with all of the nodes/peers/computers 401-406.

As such, the leader peer (computer 405) organizes all transactions from the nodes/peers/computers/telecommunication devices 401-406, and then shares new blocks/transactions (Tx) with other nodes (e.g., computers 403, 406) as depicted.

In one or more embodiments of the present invention, the blockchains (including the depicted blockchains 408, 409, 410) are "anchored" to a particular user by adding to the block/transaction information such as that shown in table 202 in FIG. 2 as well as the particular user's name ("Bob").

Figure 5:
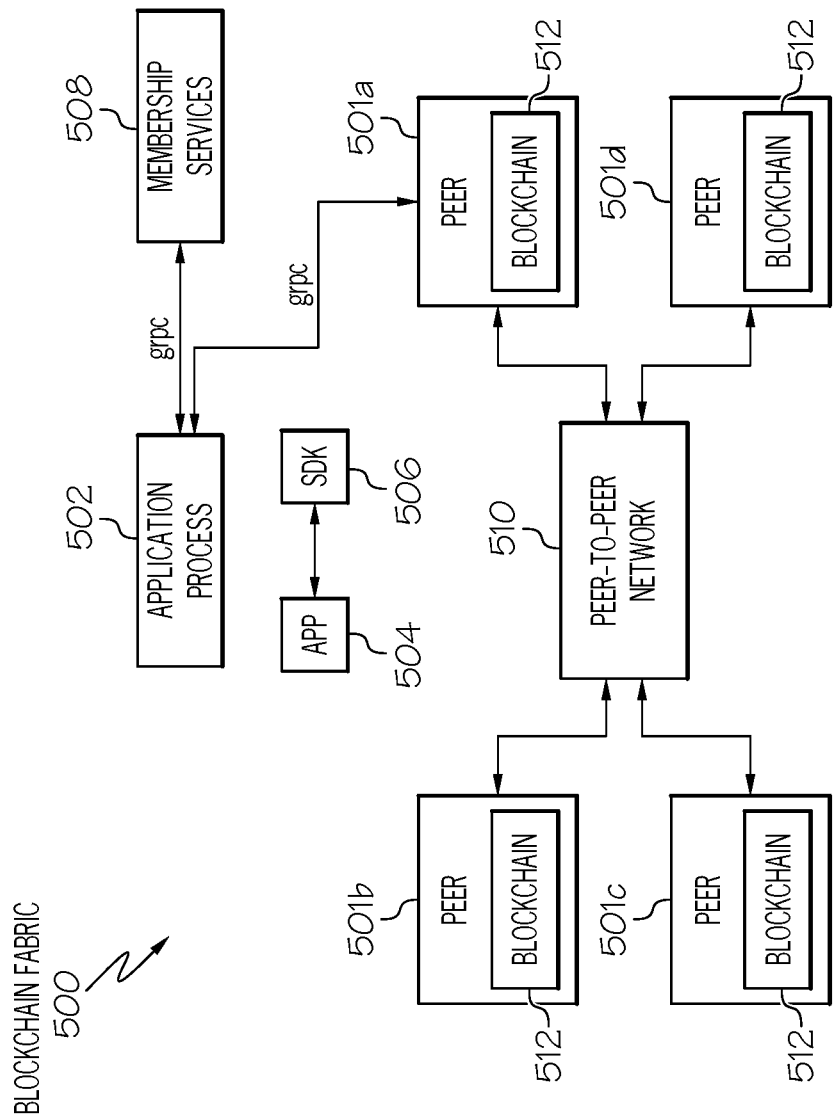
FIG. 5 illustrates additional detail of an exemplary blockchain topology as used in one or more embodiments of the present invention.
Figure 6:
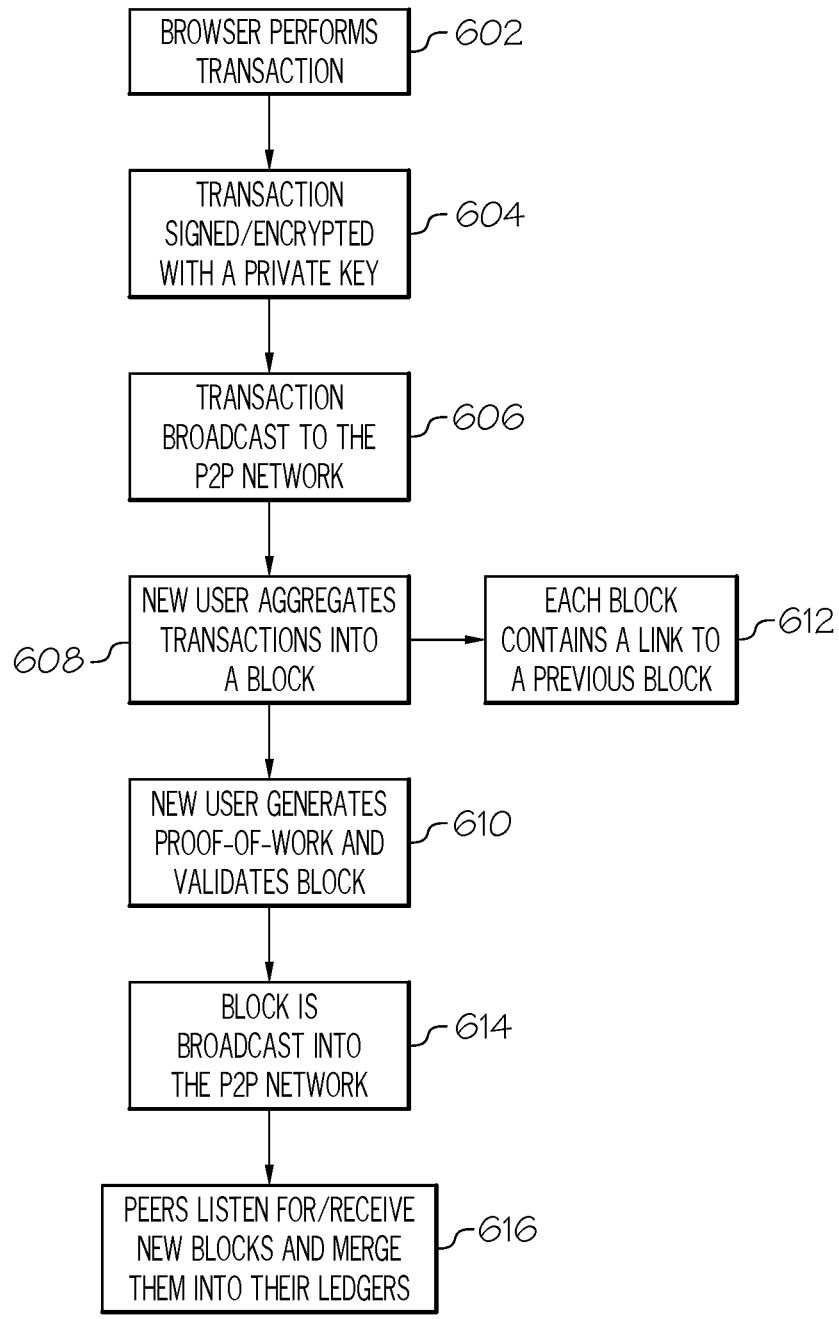
FIG. 6 depicts a high-level use of a blockchain in accordance with one or more embodiments of the present invention.

With reference now to FIGS. 5-6, additional detail of a blockchain and its operation as used by the present invention is presented.

In one or more embodiments of the present invention, a blockchain fabric, such as blockchain fabric 500 depicted in FIG. 5, is used to provide the infrastructure (e.g. execution of the chaincodes) and services (e.g., Membership services such as Identity management) for securely and transparently storing, tracking and managing transactions on a "single point of truth". The blockchain fabric 500 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 500 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 5, peers 501a-501d (i.e., other computers, servers, etc.) establish the validity of the transaction parameters and, once they reach consensus, a new block is generated and appended onto the blockchain network. That is, an application process 502 running on a client (e.g., client 407 shown in FIG. 4) executes an application such as the depicted App 504, causing a software development kit (SDK) 506 to communicate using general remote procedure calls (grpc) to membership services 508 that support the peer-to-peer network 510 that supports the blockchain 512 using the peers 501a-501d.

Exemplary operation of the open blockchain fabric 500 shown in FIG. 5 is presented in FIG. 6. As described in step 602, a browser (e.g., on client 407 shown in FIG. 4) performs a transaction (e.g., creating a new feature on an identity asset). As shown in step 604, the client signs and encrypts the transaction with a private key, such as SHA-2. This SHA-encrypted transaction is then broadcast to the peer-to-peer network 510, as described in step 606. A new user (e.g., peer 501c) aggregates the transaction(s) into blockchain 512, as shown in step 608. As shown in link 612, each block contains a link to a previous block. The newly-revised blockchain 512 is validated by one or more of the other peers in peers 501a-501d (step 610), and is then broadcast to the peers 501a-501b and peer 501d, as described in step 614. These peers 501a-501b and peer 501d listen for and receive the new blocks and merge them into their copies of blockchain 512 (step 616).

Thus, the open blockchain fabric 500 shown in FIG. 5 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 500 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

In one or more embodiments of the present invention, a new and novel protocol for anonymous and unlinkable identity asset exchange is utilized, as described in further detail below. In this protocol, an identity asset provider (e.g., bank A) and the identity asset consumer (e.g., bank B) exchange the identity asset of the user anonymously, in a decentralized identity management platform backed by a blockchain network. Carrying out the identity asset exchange transactions over the decentralized and trusted identity platform backed by blockchain eliminates the requirement of a trusted third party. However, in this protocol alone, there could be threats to the ownership of the identity asset being exchanged, due to the anonymity of the parties involved. As such, the present invention defines the owners of the identity asset as both the user and the identity provider, although the identity asset is usually held at the identity provider. Thus, only the original owners of the identity asset are able to legitimately transfer the identity asset to an identity consumer.

Figure 7:
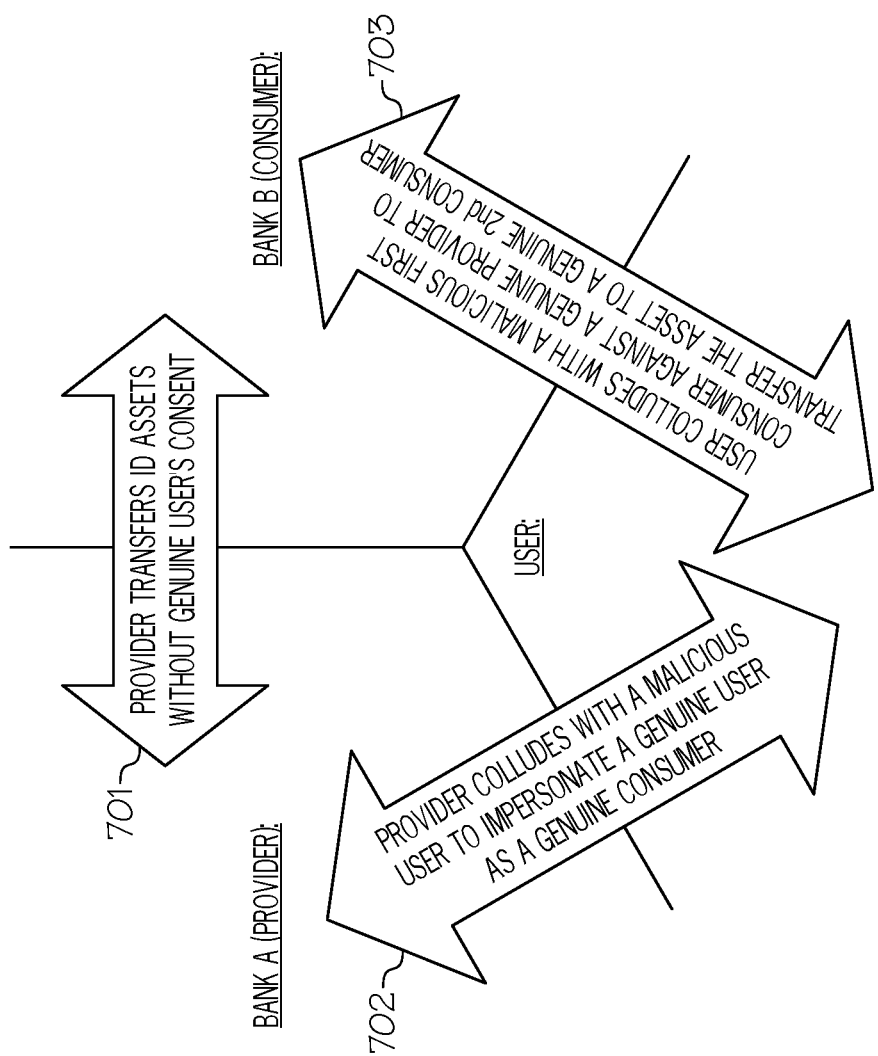
FIG. 7 illustrates potential problems from sharing identity assets that are addressed by one or more embodiments of the present invention.

Due to the anonymity property of the identity exchange transactions, any two parties could maliciously collude against the genuine party(parties) to compromise the ownership assurance of the identity asset. FIG. 7 illustrates three main threats to the ownership assurance, as discussed below.

As shown in arrow 701, the identity asset provider (e.g., bank A) and an identity asset consumer (e.g., bank B) could collude to exchange a user's identity asset without the user's consent. Since the identity asset is usually held at the identity provider, this can be done by any malicious identity asset provider. However, for the identity asset exchange transaction to be valid and for the identity asset consumer to prove the verification of the user's identity to auditors, a preferred embodiment of the present invention requires that the identity asset exchange transaction be signed by both of the owners of the identity asset (i.e., the identity asset provider and the user).

As shown in arrow 702, the identity asset provider and a malicious user could collude to impersonate a genuine user at a genuine identity asset consumer by presenting the genuine user's identity asset as that of the malicious user. Although a preferred embodiment of the present invention requires both owners' (identity asset provider and user) signatures in the preliminary protocol, they are appearing with pseudonyms. Therefore, nobody can verify if the two signatures are from the actual owners or not, which leads to this second attack on ownership assurance. The present invention addresses this problem below.

As shown in arrow 703, the user and a malicious identity asset consumer could collude to claim the ownership of an identity asset created by a genuine identity asset provider and to transfer it to another genuine identity asset consumer. Once the identity asset of a user is transferred to an identity asset consumer, the identity asset consumer and the user could collude to act as the original owners of the identity asset and perform identity asset exchange transactions with other identity asset consumers, by excluding the original identity asset provider from the scenario. This attack is motivated especially in the cases where there is a monetary payment for the original creator of the identity asset, by the identity asset consumer. As described with regard to arrow 702 above, due to anonymity, a subsequent identity asset consumer would be unable to verify if the signatures on the transferring identity asset are from the original owners or not. The present invention also addresses this problem below.

The present invention thus provides an anonymous identity asset exchange protocol that is executed in a trusted identity platform backed by a permissioned blockchain network, such as a hyperledger-fabric.

Two assumptions related to the context in which this protocol is used are:

1) There is a standard format for an identity asset used for a particular identity verification scenario (e.g., KYC compliance verification in banks) that all parties agree on. Therefore, if multiple copies of a particular type of identity asset are created using the identity information of a given user by multiple parties, all of them would result in identical identity assets.

2) If a particular type of identity asset used for a particular identity verification scenario (e.g., KYC compliance verification in banks) is created by one identity provider (e.g., bank A), then other organizations who need to use such an identity asset of the user should re-use the already created identity asset, without re-creating it.

Figure 8:
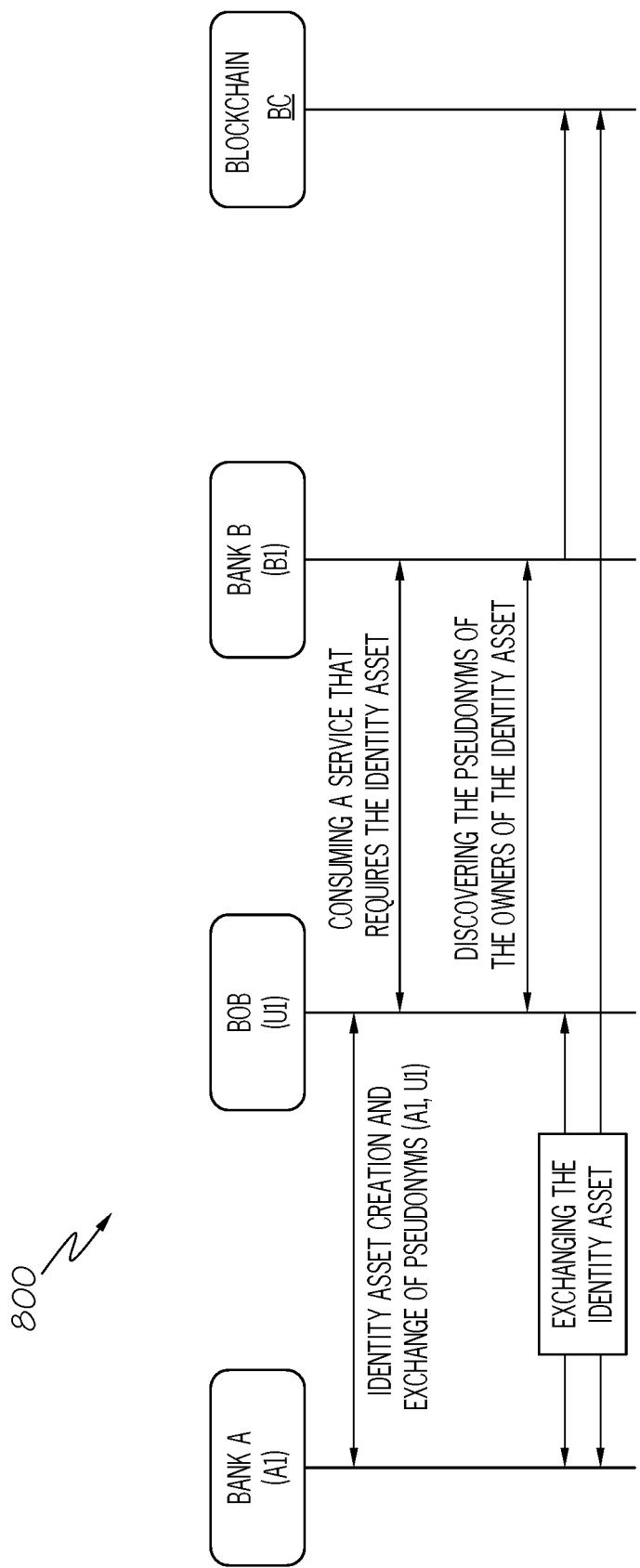
FIGS. 8-11 illustrate an exemplary bank use case in accordance with one or more embodiments of the present invention.

In FIG. 8, a high-level overview of the protocol presented herein to address the threats to ownership assurance caused by the three collusion attacks listed above is presented in chart 800.

The first type of attack (shown in arrow 701 in FIG. 7) is addressed in the preliminary protocol by requiring the consent from both the owners of the identity asset, during the transfer of the identity asset to the identity consumer. In the extended protocol proposed here, there is a further requirement that such consent must be verified to be from the original owners of the identity asset. This extension is further explained below.

The second type of attack (shown in arrow 702 in FIG. 7) is addressed by tying the identity of the original owners to the identity asset at the identity asset creation and requiring them to prove the ownership of such tied identity during the transfer of the identity asset. A preferred embodiment of the present invention then adds two new phases to the preliminary protocol in order to enable this, namely: i) an ownership declaration phase—during the identity asset creation, and ii) a proof of ownership phase—during the identity asset transfer.

The third type of attack (shown in arrow 703 in FIG. 7) is addressed by eliminating duplication during the ownership declaration. In other words, the protocol makes sure that there can be only one ownership declaration made for one particular identity asset of a given user. The present invention extends the ownership declaration phase described above by requiring the verification of non-duplication before an ownership declaration is accepted as valid.

Figure 9:
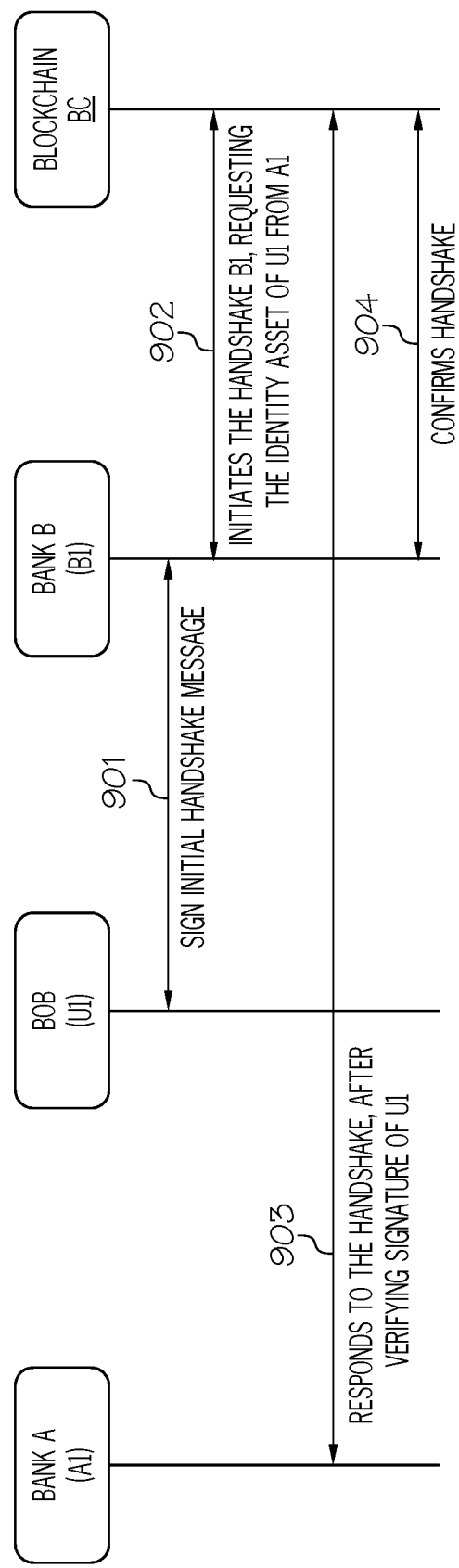
Figure 10:
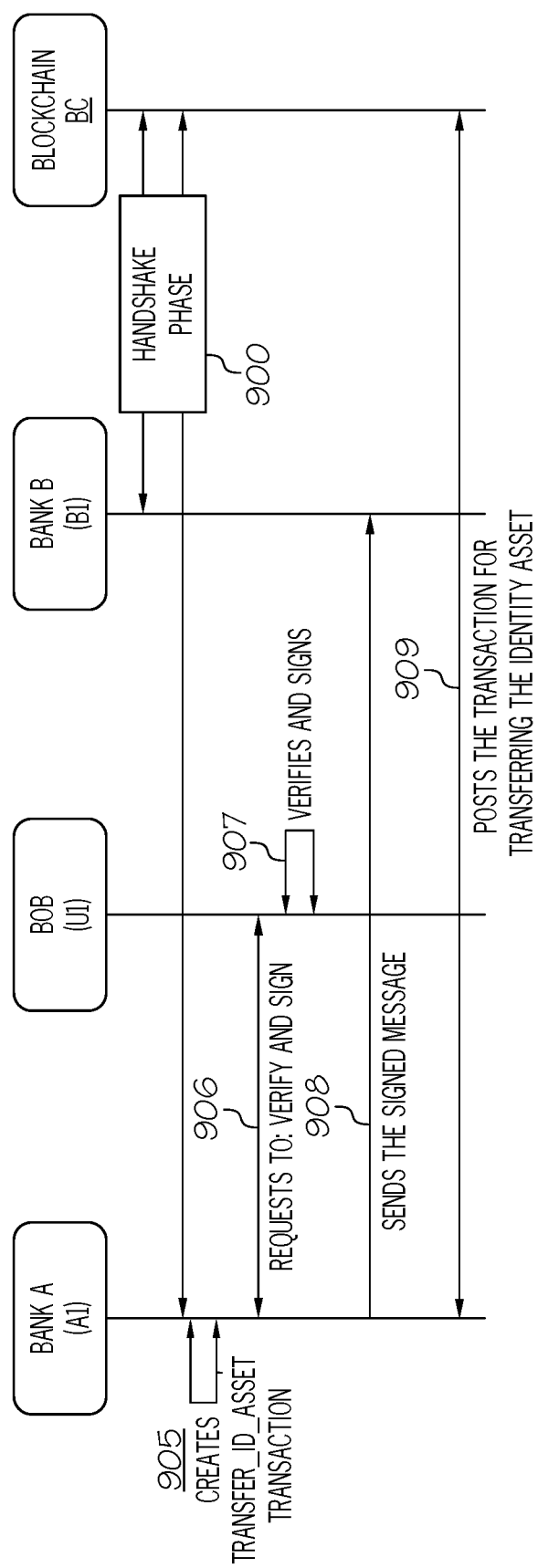
Figure 11:
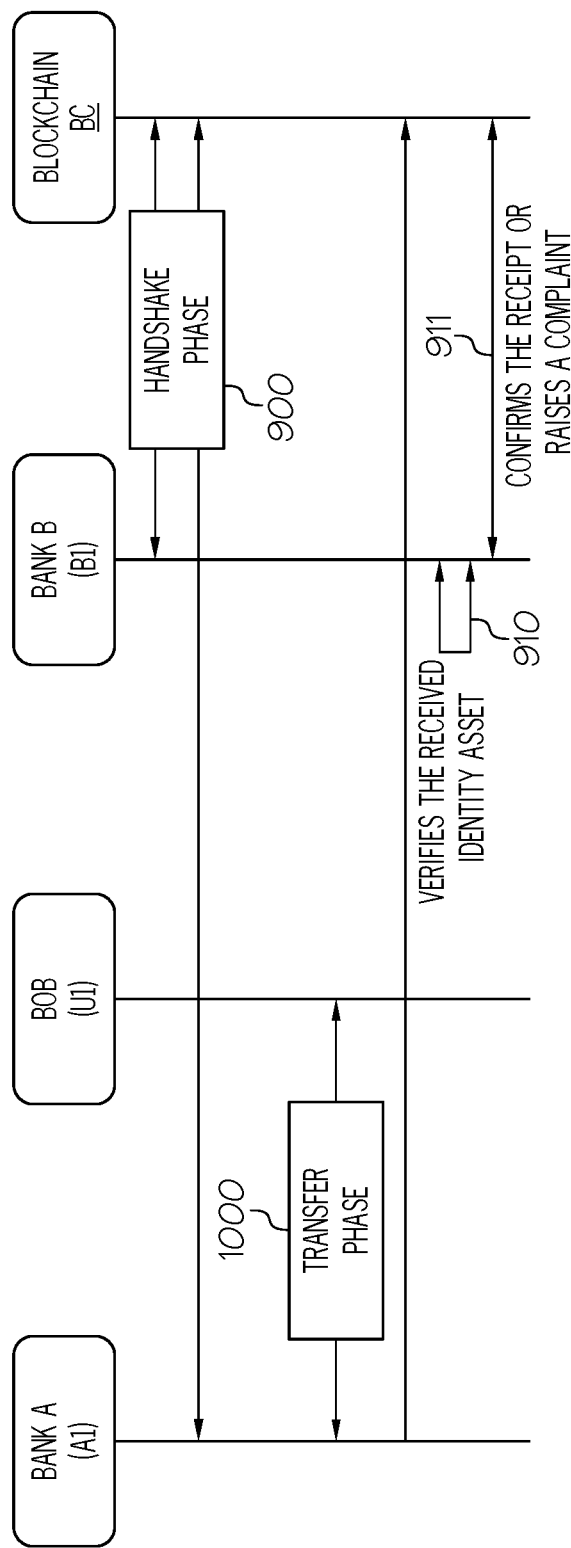

With reference now to FIGS. 9-11, a preliminary protocol is described as used in one or more embodiments of the present invention.

As shown in FIG. 9, the initial signed handshake message is signed by Bob and bank B (the identity consumer in the exemplary usecase) who are appearing with pseudonyms: U1 and B1 respectively, as shown in step 901. As shown in step 902, B1 initiates a handshake, by posting the initial handshake message to the blockchain requesting the identity asset for U1 from A1, which is the pseudonym of bank A (the identity provider in this exemplary case). The blockchain broadcasts the initial handshake message to all the participants in the blockchain. Bank A identifies that the message is intended to it, as it is the owner of the pseudonym A1. As shown in step 903, bank A (appearing with pseudonym A1) responds to the initial handshake message (after verifying the signature of U1 and B1 in the initial handshake message), by posting a response handshake message to the blockchain. As shown in step 904, B1, which receives the response handshake message via blockchain, then confirms the handshake by posting a confirm handshake message to the blockchain.

As shown in FIG. 10, once the handshake phase 900 (described in FIG. 9) is completed, A1 creates a transfer_id_asset transaction (step 905), by encrypting the user's identity asset with a key known to B1, and then requests U1 to verify and sign the transfer transaction for the user's identity asset (step 906). U1 does so (step 907). A1 then posts the transaction for transferring the identity asset to BC (step 909).

As shown in FIG. 11, once the handshake phase 900 (described in FIG. 9) and the transfer phase 1000 (described in FIG. 10) are complete, B1 verifies the received identity asset from A1 (via BC) by decrypting it, as shown in step 910. As shown in step 911, B1 then confirms receipt of the valid identity asset by posting a confirmation message to blockchain, or else B1 raises a complaint (if the identity asset is not valid) for dispute resolution.

Figure 12:
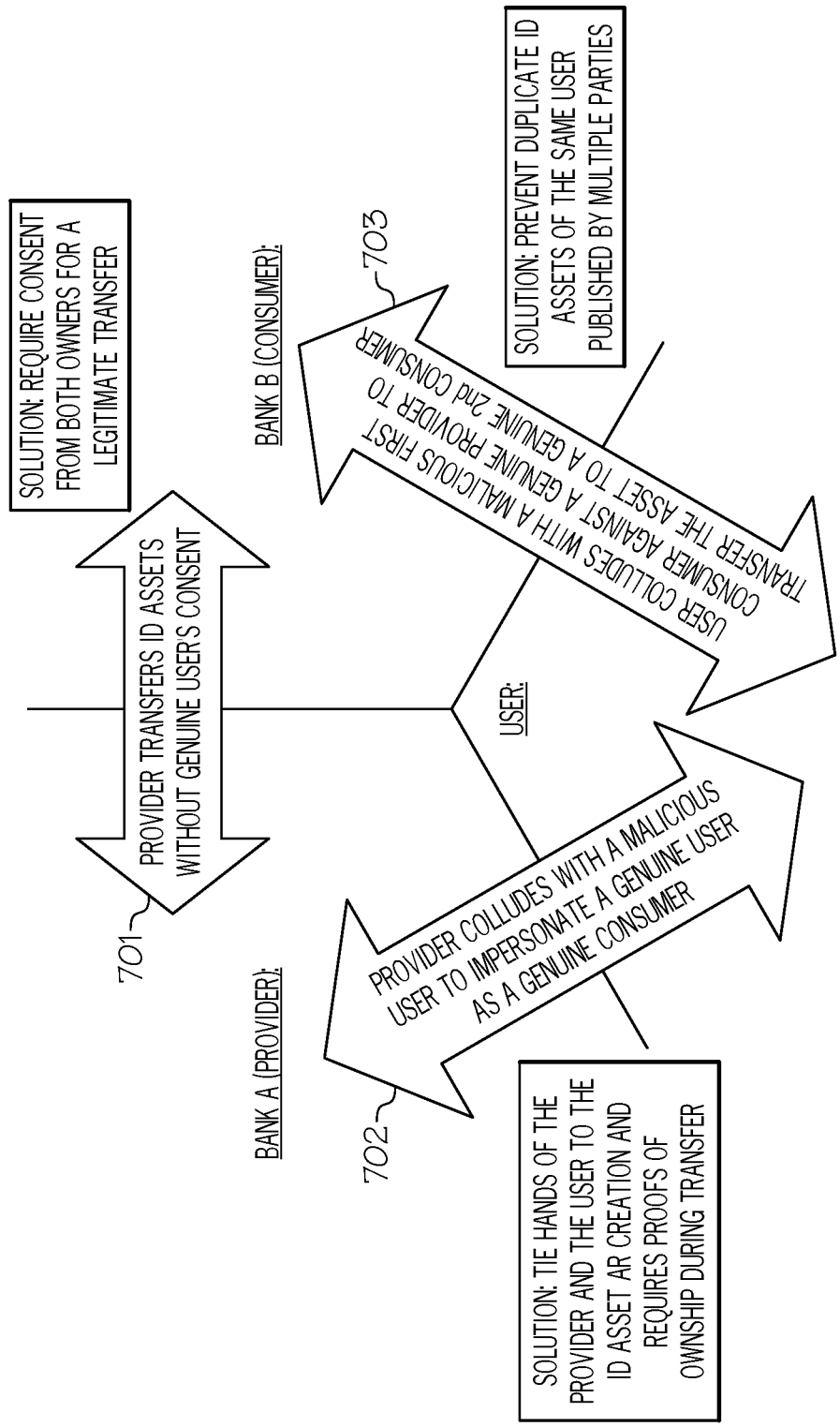
FIG. 12 depicts solutions provided by the present invention to solve the problems shown in FIG. 7.

The processes which solve the problems introduced in FIG. 7 according to the solutions shown in FIG. 12, are described below. These processes are implemented on top of the preliminary anonymous identity asset exchange protocol described before.

Figure 13:
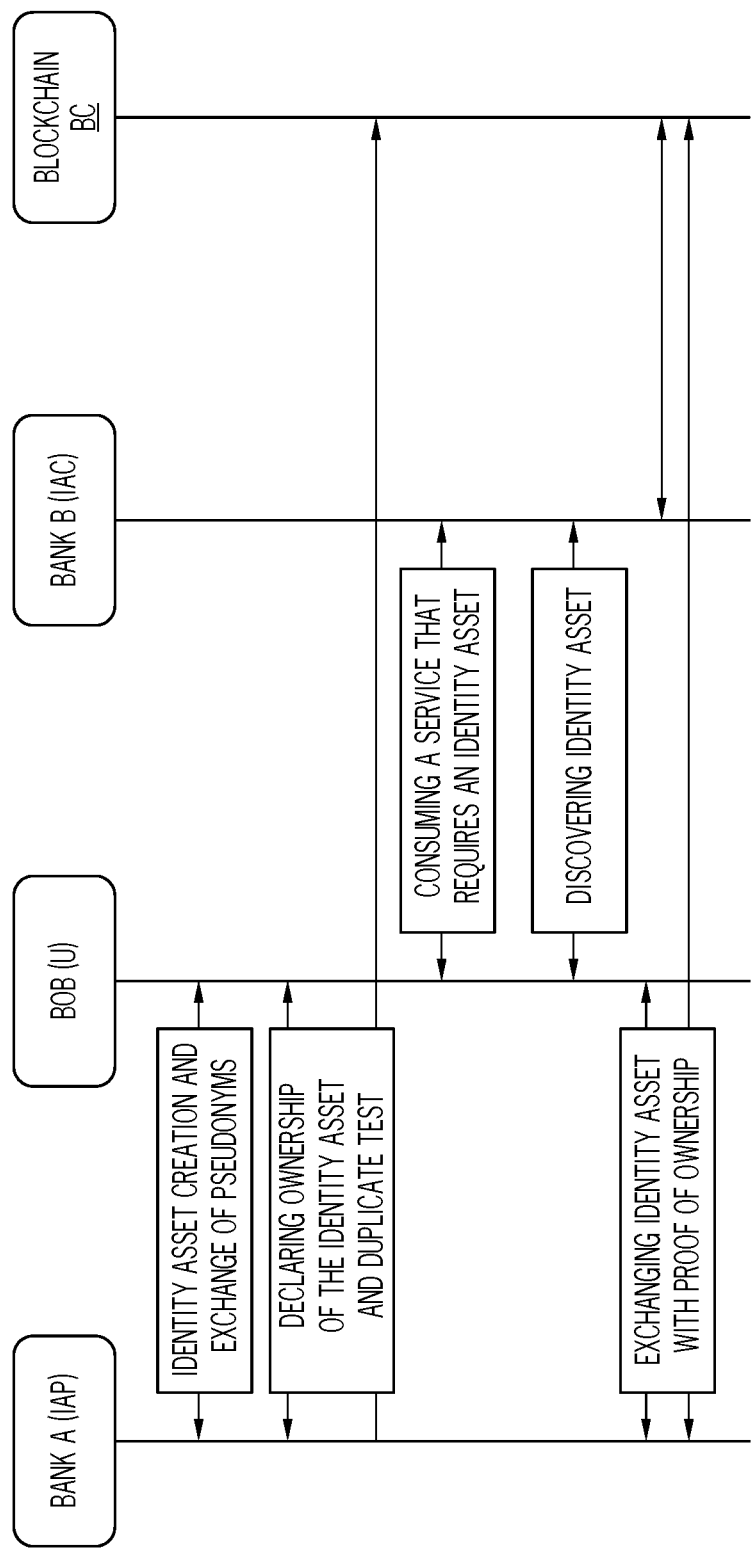
FIG. 13 illustrates a high-level overview of one or more embodiments of the present invention.
Figure 15:
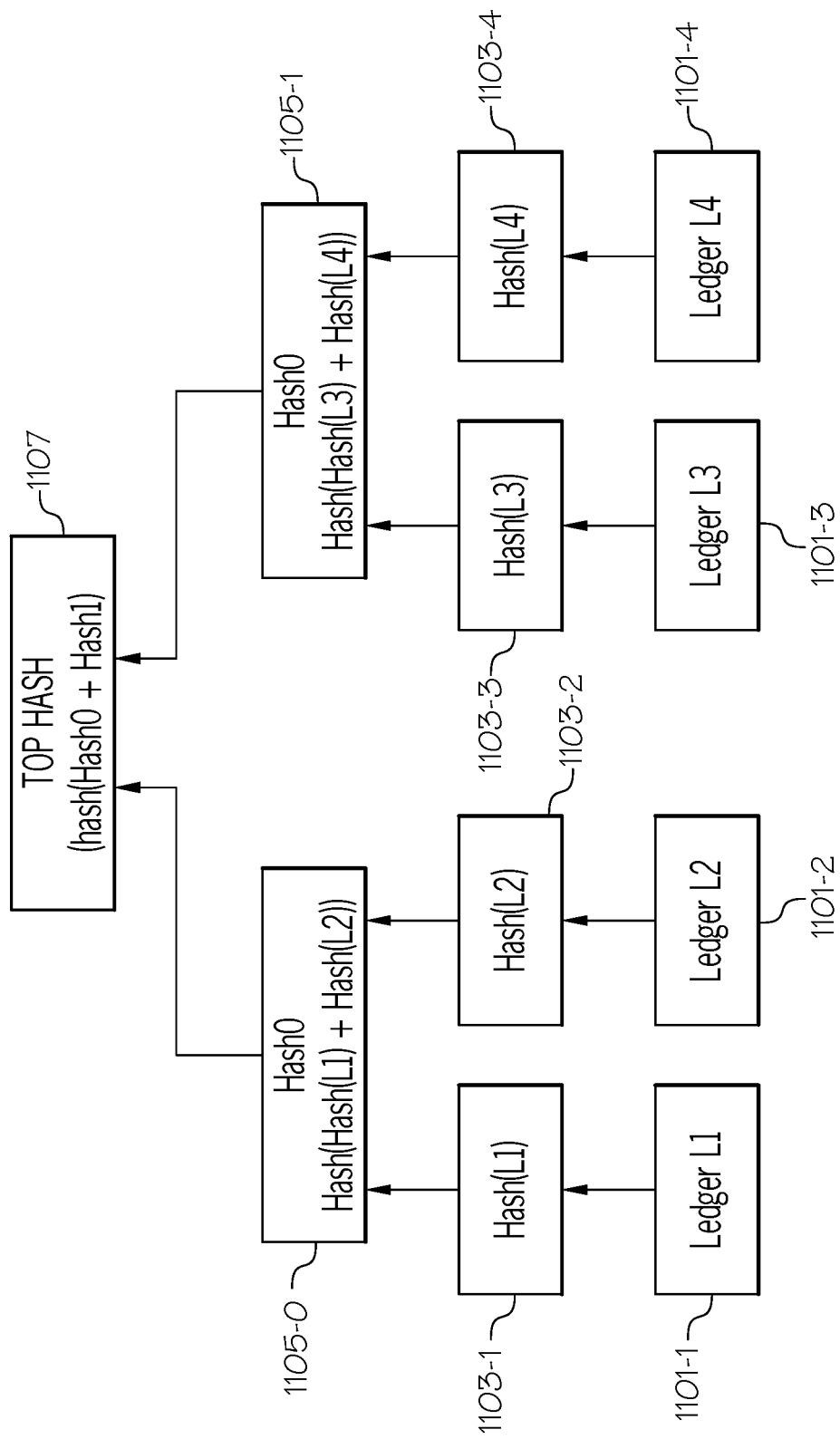
FIG. 15 illustrates an exemplary merkle hash tree as used in one or more embodiments of the present invention.

In order to integrate the aforementioned solutions to the anonymous identity asset exchange protocol described above, a preferred embodiment of the present invention extends the protocol by introducing three main sub phases, namely: i) ownership declaration phase; ii) (non-) duplication verification phase; and iii) proof of ownership phase, as illustrated in the extended protocol shown in FIG. 13. In the following protocol listings, IAP stands for Identity Asset Provider (i.e., an IAP that utilizes a computer that is an identity asset provider device, such as a device used by bank A) and IAC stands for Identity Asset Consumer (i.e., an IAC that utilizes a computer that is an identity asset consumer device, such as a device used by bank B).

A. Ownership Declaration Phase ("Protocol 1"):

Details of inputs, output, protocol execution, IAP actions, user actions, and blockchain peers' actions according to "Protocol 1: Ownership declaration" are shown in FIG. 14.

As mentioned before, this protocol binds the owners' (i.e., identity provider and the user) identity to the identity asset such that the owners' identity is not revealed in the ownership declaration statement. However, such an ownership declaration statement still allows the original owners to prove the ownership during the transfer of the identity asset.

The ownership declaration phase creates a composite cryptographic commitment including commitments on the original owners' identity (i.e., public keys) and a commitment on the hash of the identity asset. The cryptographic commitment scheme has hiding and binding properties. The composite commitment is then hidden in a merkle hash tree, such that this commitment does not reveal any information, but may be used later for proving the ownership to the identity asset in an anonymous and unlinkable manner.

A "merkle hash tree" is a composite hashing of ledgers in a blockchain. For example, consider the merkle hash tree 1500 shown in FIG. 15. Ledgers 1101-1 through 1101-4 (from corresponding ledgers L1-L4) are hashed to create hashes 1103-1 through 1103-4 (corresponding to hashes L1-L4)). These hashes are then hashed to create hashes 1105-0 and 1105-1 (corresponding to Hash0 and Hash1), which are then hashed to create a top hash 1107.

Returning to the ownership declaration phase, let the identity provider's real identity be represented by the key pair: $IAP_{pk}$ and $IAP_{sk}$ and let the user's real identity be represented by the key pair: $U_{pk}$ and $U_{sk}$.

Both the user and the identity provider use anonymous identities for signing the ownership declaration transaction. Let the anonymous identity of the identity provider be represented by the key pair: $IAP'_{pk}$ and $IAP'_{sk}$. Let the anonymous identity of the user be represented by the key pair: $U'_{pk}$ and $U'_{sk}$.

Let the hash of the identity asset be represented by h.

The user and IAP together create a composite cryptographic commitment combining the commitments on $IAP_{pk}$, $U_{pk}$ and h and sign it using their private keys of their anonymous identities.

Add this composite commitment as a leaf in the merkle hash tree maintained in the public ledger of the blockchain network.

The ownership declaration phase ties the hands of the two owners of an identity asset to the identity asset. But it does not solve the problem of protecting ownership assurance fully, because any two anonymous parties can publish an ownership declaration transaction on any identity asset, making duplicate ownership declarations on the same identity asset possible. Therefore, the present invention enhances the ownership declaration phase by adding another phase for non-duplication verification of the ownership declaration transactions, as described in the following subsection.

B. Non-Duplication Verification Phase ("Protocol 2"):

Details of the input from the IAP, output, and protocol execution by the IAP and blockchain to "Protocol 2: Verifying non-duplication" are shown in FIGS. 16A-16B.

Three potential approaches to address the aforementioned issue of potential duplication of ownership declaration include:

1) Involving a trusted registrar: In this approach, a trusted party called 'registrar' will be involved only in the ownership declaration phase, to prevent duplicate ownership declarations. In this approach, the user sends $T_{dec2}$ (see Protocol 1 in FIG. 14), along with h to the registrar and proves that h is in $T_{dec2}$. Then the registrar checks if h is associated with any identity asset related to which ownership has been declared already. If not, the registrar approves $T_{dec2}$ to be published in the ledger. This approach has the drawback of relying on a trusted party and revealing the hash of the identity asset in plain text.

2) Verifying non-duplication using encrypted hash value: in another embodiment, the approach is to check for duplication using encrypted hashes. Let E' be a threshold encryption scheme whose public key is known to everyone but only the peers can decrypt if at least t+1 of them cooperate. In this approach, the user will send $T_{dec2}$ (see Protocol 1 in FIG. 14), along with $E'_h$ to the blockchain and proves in zero knowledge that the same h is in both $E'_h$ and $T_{dec2}$. Then the blockchain peers check whether h is in previously published E' and if not, the blockchain peers accept $T_{dec2}$ as a valid ownership declaration transaction. While this approach avoids the two drawbacks mentioned in the previous approach, it still does not preserve unlinkability because a malicious party colluding with one blockchain peer can learn which $T_{dec2}$ is associated with a known identity asset.

3) Verifying non-duplication by evaluating a polynomial with the hash value: in another embodiment, the approach is to check for duplication by evaluating a polynomial, whose coefficients represent the encrypted hash of previously declared identity assets, with the encrypted hash of the identity asset being declared. The encryption scheme is an additive threshold encryption scheme as in the previous approach. This approach allows the blockchain peers to learn only the fact that there is a duplication or not and nothing else. Therefore, it preserves unlinkability.

In what follows, we describe in detail the third approach (3) because it is the one that gives full privacy preservation.

High-level overview of the protocol that verifies non-duplication of ownership declaration of an identity asset.

Goal: Verifying that the cryptographic hash h of an identity asset committed in a commitment C has not been claimed for ownership by another party previously, without compromising anonymity and unlinkability of the transactions and confidentiality of the identity asset.

Assumption: As long as an attacker does not control more than a threshold t of blockchain peers, then the peers learn whether a user's input h (of C) is in blockchain or not and nothing else.

High-level idea:

Let H=h1, h2, . . . , hn be the set of h's contributed by identity providers and recorded in the blockchain (BC).

This set is represented through the unique polynomial of degree n that has h1, h2, . . . , hn as its roots.

Let this polynomial be denoted by $P^{H(x)}$ and let $P^{H(x)} = \Pi_{i=1}^{n}(x-h_i)$. (H is omitted in the notation and the $i^{th}$ coefficient of P(x), for i=0, . . . , n is denoted by $P_i$.)

This polynomial is initialized as P(x)=1 and then its degree increases with each new committed h (see Protocol 1 for details).

Let E be an additive encryption scheme whose public key is known to everyone. However, only the peers may decrypt if at least t+1 of them cooperate.

In order to hide h values, the representation of P(x) in BC will consist of each of P's coefficients $P_i$ encrypted under E.

Thus, at any given time, if n values h have been committed to BC, then BC contains n+1 values $e_i = E(p_i)$, i=0, . . . , n.

In order to verify non-duplication, the basic idea is to evaluate P(x) on a given h and check if the result is not 0 because P(h)=0 if h is in H.

C. Proof of Ownership Phase ("Protocol 3"):

Details of the input from the IAP, output, and protocol execution by the IAP and blockchain to "Protocol 3: Proof of ownership" are shown in FIGS. 17A-17B.

This phase is added to enhance the transfer phase (described in FIG. 10) or the preliminary Protocol 1 illustrated in FIG. 8 and FIG. 14.

High-level overview of the protocol for proving the ownership of an identity asset.

Goal: Proving the ownership of the private key associated with the public key committed in the composite commitment (Cc) of Protocol 1. And proving that the hash h committed in Cc of Protocol 1 is the same as the hash of the identity asset being transferred.

Assumption: The proof system preserves zero knowledge property.

High-level idea:

Let the root of the merkle hash tree be rt.

The identity provider and the user together proves that they know a composite commitment Cc, hidden in the merkle hash tree with root rt, which includes commitments to the public keys for which they own the private keys and that Cc also includes a commitment to the hash of the identity asset which is equal to the identity asset being transferred.

Figure 18:
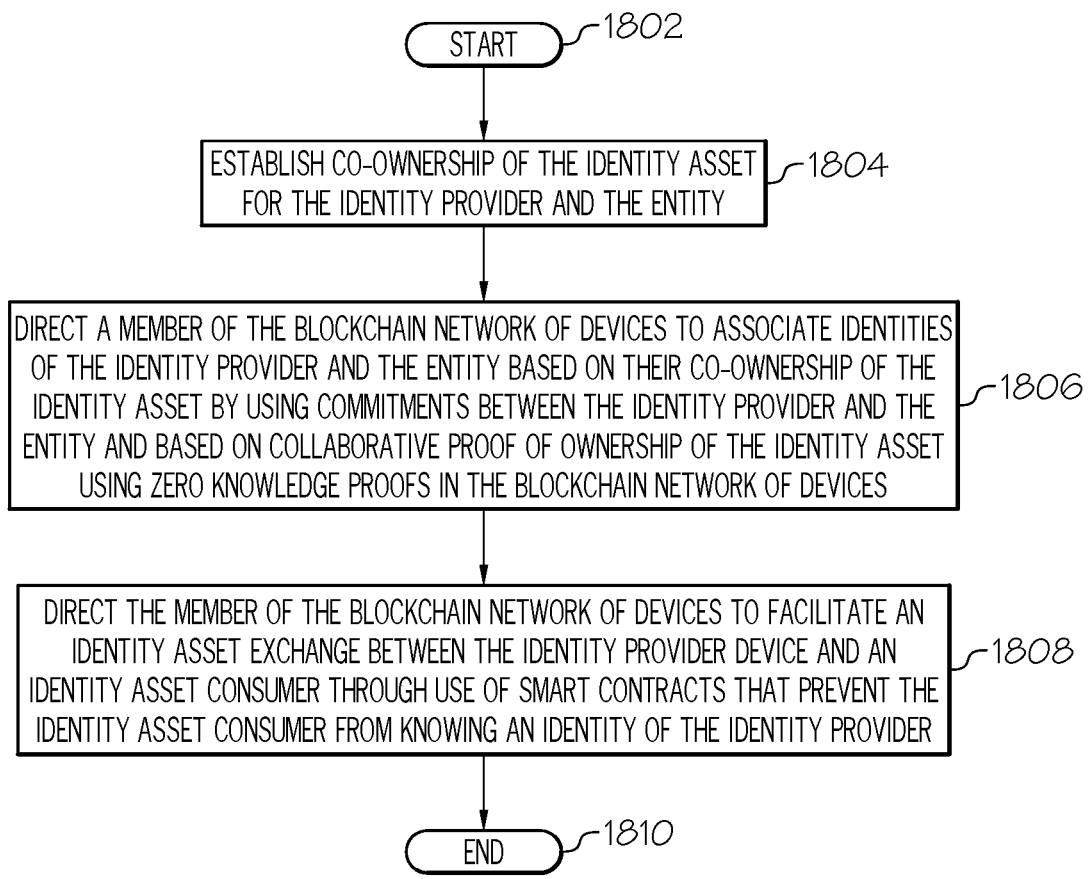
FIG. 18 is a high-level flow-chart of one or more steps performed in a processor-based method in accordance with one or more embodiments of the present invention.

With reference now to FIG. 18, a high-level flow chart of one or more embodiments of the present invention, as performed by an identity asset provider device, is presented. That is, FIG. 18 depicts exemplary technology-based steps for improving security in a blockchain network of devices by protecting identity asset confidentiality, where the blockchain network of devices supports a blockchain.

After initiator block 1802 and as described in block 1804, an identity asset provider device (e.g., a processor-based hardware device that is used by IAP shown in FIG. 13) that is controlled by an identity asset provider (e.g., IAP) establishes co-ownership of the identity asset for the identity provider and the entity, as described in FIGS. 13-17 and other figures/passages in the present patent application.

As described in block 1806, the identity asset provider device directs a first member of the blockchain network of devices (e.g., peer computer 401 shown in FIG. 4) to associate identities of the identity provider and the entity based on their co-ownership of the identity asset by using commitments between the identity provider and the entity and based on collaborative proof of ownership of the identity asset using zero knowledge proofs in the blockchain network of devices, as described in Protocols 1-3 shown in FIGS. 14 and 16-17.

As described in block 1808, the identity asset provider device directs a second member of the blockchain network of devices (e.g., peer computer 405 shown in FIG. 4) to facilitate an identity asset exchange between the identity provider device and an identity asset consumer device (e.g., a computer that is used by bank B (IAC) in FIG. 13) through use of commitments that prevent the identity asset consumer device from knowing an identity of the identity provider. That is, these commitments are hidden (e.g., within merkle trees), such that the identity provider device and the identity asset consumer device are unable to identity each other. In one embodiment, the first member of the blockchain network of devices and the second member of the blockchain network of devices is a same device from the blockchain network of devices.

The flow-chart ends at terminator block 1810.

In an embodiment of the present invention, the processor-implemented method further includes registering, by the identity asset provider device, details of the creation of the identity asset with a trusted registrar service (e.g., membership services 508 shown in FIG. 5). The identity asset provider device then posts a declaration of anonymous ownership of the identity asset to the trusted registrar service.

In an embodiment of the present invention, the identity asset provider device detects that the blockchain network of devices has received a signed declaration of anonymous ownership of the identity asset from the trusted registrar service, where the signed declaration of anonymous ownership of the identity asset includes a unique hash value of the identity asset. The identity asset provider device receives a public key from the blockchain network of devices (i.e., a particular device from the blockchain network of devices sends a public key to the identity asset provider device), thus enabling the identity asset provider device to encrypt the unique hash value with the public key received from the blockchain network of devices.

In an embodiment of the present invention, the identity asset provider device directs the first member of the blockchain network of devices to identify duplicate previously encrypted records pertaining to the entity, and then directs the first member of the blockchain network of devices to block the identified duplicate previously encrypted records from being accessed from the blockchain network of devices. That is, when an identity asset provider creates an identity asset of a user, there is a need for an anonymous ownership declaration (i.e., by posting the anonymous ownership declaration to the blockchain). However, any new ownership declaration is added to the public ledger, only if it does not duplicate with any previously published ownership declarations. For preventing a duplicate ownership declaration being added to the ledger of the blockchain, the present invention presents various potential methods to preserves all privacy requirements. (See Protocol 2 shown in FIGS. 16A-16B.)

In an embodiment of the present invention, the identity asset provider device is a first computer that is controlled by a first bank, the identity asset consumer device is a second computer that is controlled by a second bank, and the identity asset is loan application information that was created by the first bank for the entity using the identity information supplied by the entity and supplemental information supplied by the first bank for a loan application. (See FIG. 8 and FIG. 13.)

In an embodiment of the present invention, the identity provider asset device is a first computer that is controlled by a first enterprise, the identity consumer device is a second computer that is controlled by a second enterprise, and the identity asset is employment application information that was created by the first enterprise for the entity using the identity information supplied by the entity and supplemental information supplied by the first enterprise for an employment application for the entity. That is, a first employer can create a completed employment application for a particular job applicant, which can then be securely shared with a second employer by utilizing the protocols and processes described herein.

Thus, as described herein, an embodiment of the present invention is a processor-implemented method, computer program product, and/or computer system that improves security in a blockchain network of devices by protecting security, privacy and ownership assurance of identity assets, where the blockchain network of devices supports a blockchain, and where the processor-implemented method includes: establishing, by an identity asset provider device, co-ownership of an identity asset for an identity asset provider and an entity; and directing, by the identity asset provider device, a first member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices.

In an embodiment of the present invention, the processor-implemented method further includes: registering, by the identity asset provider device, details of a creation of the identity asset with a trusted registrar service; posting, by the identity asset provider device, a signed declaration of anonymous ownership of the identity asset along with a unique hash value of the identity asset to the trusted registrar service; verifying, by the trusted registrar service, whether a posted hash value of the identity asset is a duplicate of one of previously posted unique hash values of identity assets related to previously posted declarations of anonymous ownership of identity assets; and rejecting, by the trusted registrar service, a declaration of anonymous ownership of the identity asset in response to the hash value of the identity asset being found to be a duplicate.

In an embodiment of the present invention, the processor-implemented method further includes: registering, by the identity asset provider device, details of a creation of the identity asset with a trusted registrar service; posting, by the identity asset provider device, a signed declaration of anonymous ownership of the identity asset along with a unique hash value of the identity asset to the trusted registrar service; verifying, by the trusted registrar service, whether a posted hash value of the identity asset is a duplicate of one of previously posted unique hash values of identity assets related to previously posted declarations of anonymous ownership of identity assets; and posting, by the trusted registrar service, the declaration of anonymous ownership of the identity asset to the blockchain network of devices in response to the hash value of the identity asset not being found to be a duplicate.

In an embodiment of the present invention, the processor-implemented method further includes: receiving, by the identity asset provider device, a public key from the blockchain network of devices whose private key is shared between each device of the blockchain network; encrypting, by the identity asset provider device, a unique hash value of the identity asset with the public key received from the blockchain network of devices; posting, by the identity asset provider device, the encrypted hash value of the identity asset along with the signed declarations of anonymous ownership of the identity asset to the blockchain network of devices; verifying collaboratively, by the blockchain network of devices, whether a currently posted encrypted hash value of the identity asset is a duplicate of one of the previously posted encrypted hash values of identity assets related to previously posted declarations of anonymous ownership of identity assets; and rejecting collaboratively, by the blockchain network of devices, the declaration of anonymous ownership of the identity asset in response to the encrypted hash value of the identity asset being found to be a duplicate.

In an embodiment of the present invention, the processor-implemented method further includes: receiving, by the identity asset provider device, a public key from the blockchain network of devices whose private key is shared between each device of the blockchain network; encrypting, by the identity asset provider device, a unique hash value of the identity asset with the public key received from the blockchain network of devices; posting, by the identity asset provider device, the encrypted hash value of the identity asset along with the signed declarations of anonymous ownership of the identity asset to the blockchain network of devices; verifying collaboratively, by the blockchain network of devices, whether a currently posted encrypted hash value of the identity asset is a duplicate of one of previously posted encrypted hash values of identity assets related to previously posted declarations of anonymous ownership of identity assets; and accepting collaboratively, by the blockchain network of devices, the declaration of anonymous ownership of the identity asset, in response to the encrypted hash value of the identity asset being found not to be a duplicate.

In an embodiment of the present invention, the processor-implemented method further includes: receiving, by the identity asset provider device, a public key from the blockchain network of devices whose private key is shared between each device of the blockchain network of devices; encrypting, by the identity asset provider device, a unique hash value of the identity asset with the public key received from the blockchain network of devices; performing computation in an encrypted domain, by the identity asset provider device, on the encrypted hash value of the identity asset and a previously posted combination of encrypted hash values of identity assets; posting, by the identity asset provider device, a result of the computation along with a signed declarations of anonymous ownership of the identity asset to the blockchain network of devices; verifying collaboratively, by the blockchain network of devices, whether the posted result of the computation indicates a duplication of an encrypted hash value of the identity asset with one of previously posted encrypted hash values of identity assets related to previously posted declarations of anonymous ownership of identity assets; and accepting collaboratively by the blockchain network of devices, a declaration of anonymous ownership of the identity asset, in response to a result of the computation indicating a duplication.

In an embodiment of the present invention, the processor-implemented method further includes: receiving, by the identity asset provider device, a public key from the blockchain network of devices whose private key is shared between each device of the blockchain network of devices; encrypting, by the identity asset provider device, a unique hash value of the identity asset with the public key received from the blockchain network of devices; performing computation in an encrypted domain, by the identity asset provider device, on an encrypted hash value of the identity asset and previously posted combination of encrypted hash values of identity assets; posting, by the identity asset provider device, a result of the computation along with signed declarations of anonymous ownership of the identity asset to the blockchain network of devices; verifying collaboratively, by the blockchain network of devices, whether the posted result of the computation indicates a duplication of an encrypted hash value of the identity asset with one of previously posted encrypted hash values of identity assets related to previously posted declarations of anonymous ownership of identity assets; and rejecting collaboratively, by the blockchain network of devices, a declaration of anonymous ownership of the identity asset in response to a result of the computation indicating a duplication.

In an embodiment of the present invention, the identity asset provider device is a first computer that is controlled by a first bank, the identity asset consumer device is a second computer that is controlled by a second bank, and the identity asset is loan application information that was created by the first bank for the entity using the identity information supplied by the entity and supplemental information supplied by the first bank for a loan application.

In an embodiment of the present invention, the identity provider asset device is a first computer that is controlled by a first enterprise, the identity asset consumer device is a second computer that is controlled by a second enterprise, and the identity asset is employment application information that was created by the first enterprise for the entity using the identity information supplied by the entity and supplemental information supplied by the first enterprise for an employment application for the entity.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 19:
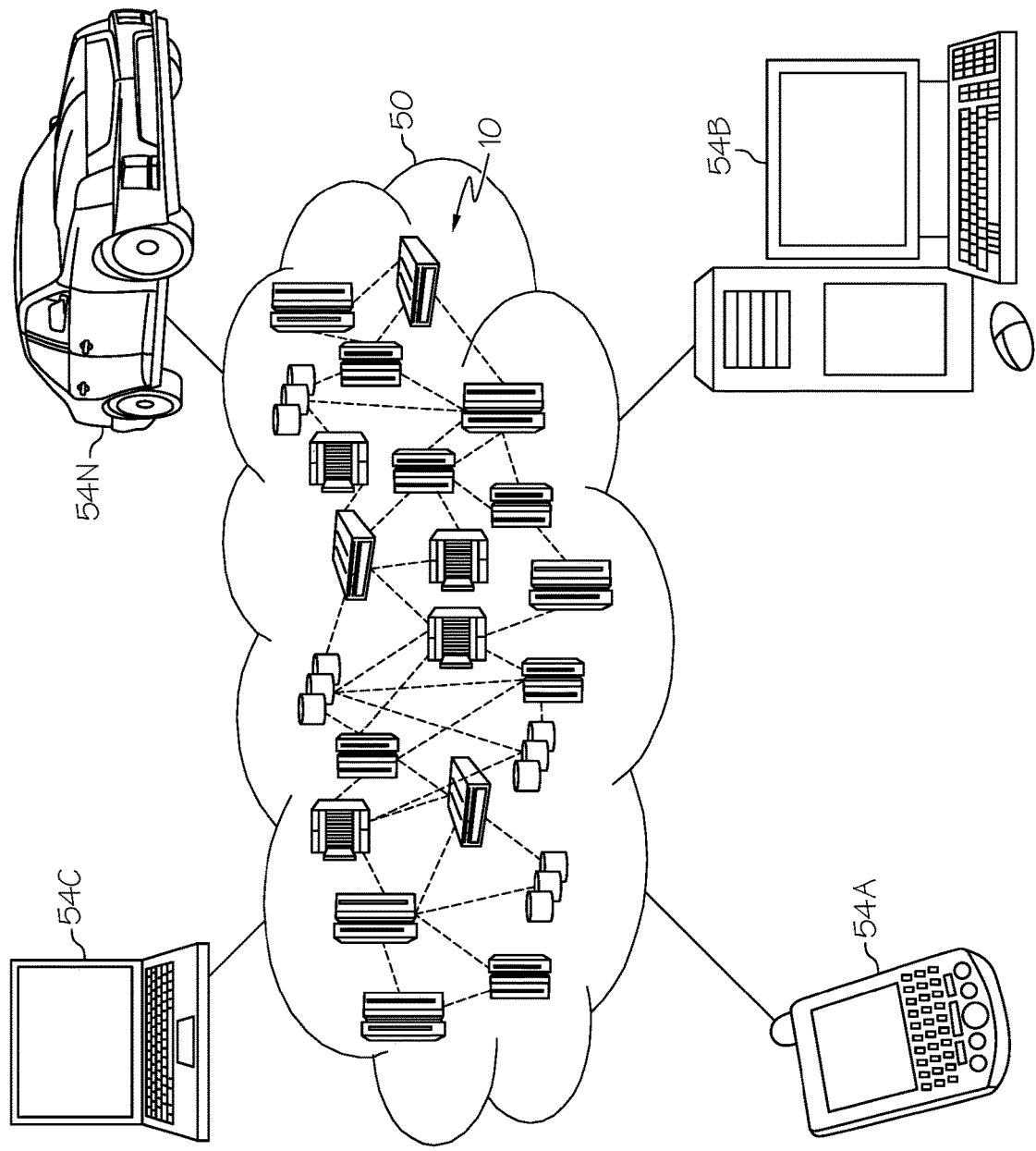
FIG. 19 depicts a cloud computing environment according to an embodiment of the present invention.

Referring now to FIG. 19, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 19 are intended to be illustrative only and that computing nodes 10 and cloud computing environment 50 can communicate with any type of computerized device over any type of network and/or network addressable connection (e.g., using a web browser).

Referring now to FIG. 20, a set of functional abstraction layers provided by cloud computing environment 50 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain security processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of improving security in a blockchain network of devices by protecting security, privacy and ownership assurance of identity assets, wherein the blockchain network of devices supports a blockchain, and wherein the processor-implemented method comprises:

establishing, by an identity asset provider device, co-ownership of an identity asset by an identity asset provider and an entity, wherein the identity asset describes the entity;

directing, by the identity asset provider device, a member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices;

registering, by the identity asset provider device, details of a creation of the identity asset with a trusted registrar service;

posting, by the identity asset provider device, a signed declaration of anonymous ownership of the identity asset along with a unique hash value of the identity asset to the trusted registrar service;

verifying, by the trusted registrar service, whether a posted hash value of the identity asset is a duplicate of one of previously posted unique hash values of identity assets related to previously posted declarations of anonymous ownership of identity assets; and posting, by the trusted registrar service, the declaration of anonymous ownership of the identity asset to the blockchain network of devices in response to the hash value of the identity asset not being found to be a duplicate.

2. The processor-implemented method of claim 1, further comprising:

receiving, by the identity asset provider device, a public key from the blockchain network of devices whose private key is shared between each device of the blockchain network;

encrypting, by the identity asset provider device, the unique hash value of the identity asset with the public key received from the blockchain network of devices;

posting, by the identity asset provider device, the encrypted unique hash value of the identity asset along with a signed declaration of anonymous ownership of the identity asset to the blockchain network of devices;

verifying collaboratively, by the blockchain network of devices, whether the currently posted encrypted unique hash value of the identity asset is a duplicate of one of previously posted encrypted hash values of identity assets related to previously posted declarations of anonymous ownership of identity assets; and rejecting collaboratively, by the blockchain network of devices, the declaration of anonymous ownership of the identity asset in response to the currently posted encrypted unique hash value of the identity asset being found to be a duplicate.

3. The processor-implemented method of claim 1, further comprising:

receiving, by the identity asset provider device, a public key from the blockchain network of devices whose private key is shared between each device of the blockchain network;

encrypting, by the identity asset provider device, the unique hash value of the identity asset with the public key received from the blockchain network of devices;

posting, by the identity asset provider device, the encrypted unique hash value of the identity asset along with a signed declaration of anonymous ownership of the identity asset to the blockchain network of devices;

verifying collaboratively, by the blockchain network of devices, whether a currently posted encrypted hash value of the identity asset is a duplicate of one of previously posted encrypted hash values of identity assets related to previously posted declarations of anonymous ownership of identity assets; and accepting collaboratively, by the blockchain network of devices, the declaration of anonymous ownership of the identity asset, in response to the currently posted encrypted hash value of the identity asset being found not to be a duplicate.

4. The processor-implemented method of claim 1, further comprising:

receiving, by the identity asset provider device, a public key from the blockchain network of devices whose private key is shared between each device of the blockchain network of devices;

encrypting, by the identity asset provider device, the unique hash value of the identity asset with the public key received from the blockchain network of devices;

performing computation in an encrypted domain, by the identity asset provider device, on the encrypted unique hash value of the identity asset and a previously posted combination of encrypted hash values of identity assets;

posting, by the identity asset provider device, a result of the computation along with a signed declaration of anonymous ownership of the identity asset to the blockchain network of devices;

verifying collaboratively, by the blockchain network of devices, whether the posted result of the computation indicates a duplication of an encrypted hash value of the identity asset with one of previously posted encrypted hash values of identity assets related to previously posted declarations of anonymous ownership of identity assets; and accepting collaboratively, by the blockchain network of devices, a declaration of anonymous ownership of the identity asset, in response to a result of the computation indicating a duplication.

5. The processor-implemented method of claim 1, further comprising:

receiving, by the identity asset provider device, a public key from the blockchain network of devices whose private key is shared between each device of the blockchain network of devices;

encrypting, by the identity asset provider device, the unique hash value of the identity asset with the public key received from the blockchain network of devices;

performing computation in an encrypted domain, by the identity asset provider device, on the encrypted unique hash value of the identity asset and a previously posted combination of encrypted hash values of identity assets;

posting, by the identity asset provider device, a result of the computation along with signed declarations of anonymous ownership of the identity asset to the blockchain network of devices;

verifying collaboratively, by the blockchain network of devices, whether the posted result of the computation indicates a duplication of an encrypted hash value of the identity asset with one of previously posted encrypted hash values of identity assets related to previously posted declarations of anonymous ownership of identity assets; and rejecting collaboratively, by the blockchain network of devices, a declaration of anonymous ownership of the identity asset in response to a result of the computation indicating a duplication.

6. The processor-implemented method of claim 1, wherein the identity asset provider device is a first computer that is controlled by a first bank, wherein an identity asset consumer device is a second computer that is controlled by a second bank, and wherein the identity asset is loan application information that was created by the first bank for the entity using the identity information supplied by the entity and supplemental information supplied by the first bank for a loan application.

7. The processor-implemented method of claim 1, wherein the identity asset provider device is a first computer that is controlled by a first enterprise, wherein an identity asset consumer device is a second computer that is controlled by a second enterprise, and wherein the identity asset is employment application information that was created by the first enterprise for the entity using the identity information supplied by the entity and supplemental information supplied by the first enterprise for an employment application for the entity.

8. A computer program product for improving security in a blockchain network of devices by protecting identity asset confidentiality, wherein the blockchain network of devices supports a blockchain, wherein the computer program product comprises a non-transitory computer readable storage device having program instructions embodied therewith, the program instructions readable and executable by a computer to perform a method comprising:

establishing co-ownership by an identity asset for an identity asset provider and an entity, wherein the identity asset describes the entity;

directing a member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices;

registering details of a creation of the identity asset with a trusted registrar service;

posting a signed declaration of anonymous ownership of the identity asset along with a unique hash value of the identity asset to the trusted registrar service;

verifying whether a posted hash value of the identity asset is a duplicate of one of previously posted unique hash values of identity assets related to previously posted declarations of anonymous ownership of identity assets; and posting the declaration of anonymous ownership of the identity asset to the blockchain network of devices in response to the unique hash value of the identity asset not being found to be a duplicate.

9. The computer program product of claim 8, wherein the method further comprises:

receiving a public key from the blockchain network of devices whose private key is shared between each device of the blockchain network;

encrypting the unique hash value of the identity asset with the public key received from the blockchain network of devices;

posting the encrypted unique hash value of the identity asset along with a signed declaration of anonymous ownership of the identity asset to the blockchain network of devices;

verifying collaboratively whether a currently posted encrypted unique hash value of the identity asset is a duplicate of one of previously posted encrypted hash values of identity assets related to previously posted declarations of anonymous ownership of identity assets; and rejecting collaboratively a declaration of anonymous ownership of the identity asset in response to the currently posted encrypted unique hash value of the identity asset being found to be a duplicate.

10. The computer program product of claim 8, wherein the method further comprises:

receiving a public key from the blockchain network of devices whose private key is shared between each device of the blockchain network;

encrypting the unique hash value of the identity asset with the public key received from the blockchain network of devices;

posting the encrypted unique hash value of the identity asset along with a signed declaration of anonymous ownership of the identity asset to the blockchain network of devices;

verifying collaboratively whether the currently posted encrypted unique hash value of the identity asset is a duplicate of one of previously posted encrypted hash values of identity assets related to previously posted declarations of anonymous ownership of identity assets; and accepting collaboratively a declaration of anonymous ownership of the identity asset, in response to the currently amended encrypted unique hash value of the identity asset being found not to be a duplicate.

11. The computer program product of claim 8, wherein the method further comprises:

receiving a public key from the blockchain network of devices whose private key is shared between each device of the blockchain network of devices;

encrypting the unique hash value of the identity asset with the public key received from the blockchain network of devices;

performing computation in an encrypted domain on the encrypted unique hash value of the identity asset and a previously posted combination of encrypted hash values of identity assets;

posting a result of the computation along with a signed declaration of anonymous ownership of the identity asset to the blockchain network of devices;

verifying collaboratively whether the posted result of the computation indicates a duplication of an encrypted hash value of the identity asset with one of previously posted encrypted hash values of identity assets related to previously posted declarations of anonymous ownership of identity assets; and accepting collaboratively a declaration of anonymous ownership of the identity asset, in response to a result of the computation indicating a duplication.

12. The computer program product of claim 8, wherein the method further comprises:

receiving a public key from the blockchain network of devices whose private key is shared between each device of the blockchain network of devices;

encrypting the unique hash value of the identity asset with the public key received from the blockchain network of devices;

performing computation in an encrypted domain on the encrypted unique hash value of the identity asset and a previously posted combination of encrypted hash values of identity assets;

posting a result of the computation along with signed declarations of anonymous ownership of the identity asset to the blockchain network of devices;

verifying collaboratively whether the posted result of the computation indicates a duplication of an encrypted hash value of the identity asset with one of previously posted encrypted hash values of identity assets related to previously posted declarations of anonymous ownership of identity assets; and rejecting collaboratively a declaration of anonymous ownership of the identity asset in response to a result of the computation indicating a duplication.

13. The computer program product of claim 8, wherein the identity asset provider is a first bank, wherein an identity asset consumer is a second bank, and wherein the identity asset is loan application information that was created by the first bank for the entity using the identity information supplied by the entity and supplemental information supplied by the first bank for a loan application.

14. The computer program product of claim 8, wherein the program instructions are provided as a service in a cloud environment.

15. A computer system comprising one or more processors, one or more computer readable memories, and one or more computer readable non-transitory storage mediums, and program instructions stored on at least one of the one or more storage mediums for execution by at least one of the one or more processors via at least one of the one or more memories, the stored program instructions comprising:

program instructions to establish co-ownership by an identity asset for an identity asset provider and an entity, wherein the identity asset describes the entity;

program instructions to direct a member of the blockchain network of devices to associate identities of the identity asset provider and the entity based on their co-ownership of the identity asset by using commitments between the identity asset provider and the entity and based on collaborative proof of ownership of the identity asset using zero knowledge proofs in the blockchain network of devices;

program instructions to register details of a creation of the identity asset with a trusted registrar service;

program instructions to post a signed declaration of anonymous ownership of the identity asset along with a unique hash value of the identity asset to the trusted registrar service;

program instructions to verify whether a posted hash value of the identity asset is a duplicate of one of previously posted unique hash values of identity assets related to previously posted declarations of anonymous ownership of identity assets; and program instructions to reject a declaration of anonymous ownership of the identity asset in response to the hash value of the identity asset being found to be a duplicate.

16. The computer system of claim 15, wherein the program instructions are provided as a service in a cloud environment.

\* \* \* \* \*